(12) United States Patent
Maier

(10) Patent No.: US 6,418,255 B1
(45) Date of Patent: Jul. 9, 2002

(54) DEVICE FOR MODULATION OF OPTICAL RADIATION AND TRANSMISSION OF INFORMATION

(75) Inventor: Alexandr Alexandrovich Maier, Moscow (RU)

(73) Assignee: Cleomen Ltd., Moscow (RU)

(*) Notice: Subject to any disclaimer, the term of this patent is extended or adjusted under 35 U.S.C. 154(b) by 0 days.

(21) Appl. No.: 09/242,269
(22) PCT Filed: Jun. 11, 1998
(86) PCT No.: PCT/RU98/00177
§ 371 (c)(1),
(2), (4) Date: Feb. 12, 1999
(87) PCT Pub. No.: WO98/57229
PCT Pub. Date: Dec. 17, 1998

(30) Foreign Application Priority Data

| Jun. 13, 1997 | (RU) | 97109964 |
| Sep. 1, 1997 | (RU) | 97114904 |
| Jan. 23, 1998 | (RU) | 98101186 |
| Feb. 17, 1998 | (RU) | 98102884 |

(51) Int. Cl.$^7$ ............................................. G02B 6/00
(52) U.S. Cl. ................... 385/122; 385/1; 385/6; 385/31; 385/2; 385/3; 385/140; 385/16
(58) Field of Search ................ 385/1, 2, 3, 6, 385/11, 14, 129, 130, 131, 122, 31, 140, 15, 16

(56) References Cited

U.S. PATENT DOCUMENTS

| 3,545,840 A | | 12/1970 | Ferguson | 385/6 X |
| 3,602,574 A | * | 8/1971 | Courtens | 385/1 X |
| 4,773,759 A | * | 9/1988 | Bergh et al. | 356/350 |
| 4,887,884 A | * | 12/1989 | Hayden | 385/122 X |
| 5,111,326 A | * | 5/1992 | Ball | 359/244 |

(List continued on next page.)

FOREIGN PATENT DOCUMENTS

| EP | 0 806 695 | 11/1997 | 385/17 X |
| JP | 62-009314 | 1/1987 | 385/122 X |
| JP | 03-144417 | 6/1991 | 385/1 X |

OTHER PUBLICATIONS

A.A. Maier, "Optical Transistors and Bistable Elements on the Basis of Nonlinear Tranmission . . .", Kvantovaya Elektron, 9, 1982, pp. 2296–2302.

(List continued on next page.)

Primary Examiner—Brian Healy
(74) Attorney, Agent, or Firm—Collard & Roe, P.C.

(57) ABSTRACT

The invention concerns to area of magneto-optics, nonlinear-optics, fiber optics. The invention allow to amplify Faraday effect drastically and obtain a high level of modulation of optical radiation at very small amplitudes of modulating variable current. So it provides a very high speed of modulation of optical radiation. It also gets an opportunity of reading the information with higher density of record. The modulator on the basis of magneto-optical Faraday effect contains optically connected: optical element made from magneto-optical material with means creating a variable magnetic field in it, a nonlinear-optical waveguide and a separator of waves having orthogonal polarizations. The possibility for rejection of atmosphere fluctuation and jamming is provided. The nonlinear-optical waveguide can be made on the basis MQW-type structure. Input/output elements, taking into account the asymmetry of cross-section of the nonlinearoptical waveguide are mounted at its input and output, as the compact nonlinear-optic module. The small current is passed across said nonlinear-optical waveguide increasing gain in modulation drastically, and decreasing pump optical power in a high degree. The device contains also Peltier element and temperature sensor which help to obtain low predetermined critical power of optical radiation necessary for obtaining large modulation gain. The modulator on the basis of magneto-optical Kerr phenomenon contains an optical element reflecting optical radiation with sites of various magnetization.

122 Claims, 4 Drawing Sheets

U.S. PATENT DOCUMENTS 5,317,666 A * 5/1994 Agostinelli et al. ......... 385/122
6,046,839 A * 4/2000 Ito et al. ...................... 359/246
6,314,215 B1 * 11/2001 Shay et al. .................... 385/16

OTHER PUBLICATIONS

A.A. Maier, "Optical Self–Switching of Unidirectional . . ." Physics–Uspekhi, vol. 38, No. 9, 1995, pp. 991–1029.

A.A. Maier, "Experimental Observation of the Optical Self–Switching . . .", Physics Uspekhi, vol. 39, No. 11, 1996, pp. 1109–1135.

M. Berwick et al "Alternating–Current Measurement and Noninvasive Data Ring . . ." Optical Letters, vol. 12, No. 4, 1987, pp. 293–295.

S. Gonda et al "Optoelectronics in Questions and Answers", Leningrad, Energoatomizdat, 1989, pp. 28–31.

S.N. Antonov et al "Faraday Optical Fiber Gauge . . .", Quantum Electronics, 18, No. 1 1991, pp. 139–141.

* cited by examiner

DEVICE FOR MODULATION OF OPTICAL RADIATION AND TRANSMISSION OF INFORMATION

TECHNICAL FIELD

The invention concerns to area of nonlinear integrated and fiber optics, to be exact to area completely of optical modulators and switches.

BACKGROUND ART

Use of devices is heretofore-known on the basis of Faraday effect, including an optical element passing optical radiation, surrounded by the solenoid for creation of a variable magnetic field (e.g., M. Berwick, J. D. C. Jones, D. A. Jackson "Alternating-current measurement and noninvasive data ring utilizing the Faraday effect in a closed-loop fiber magnetometer", "Optics letters", v.12, p.4, 1987).

The heretofore-known modulator which is the closest to the suggested modulator is the modulator on the basis of Faraday effect or magneto-optical Kerr effect, containing consistently mounted in a course of a beam an optical element from magneto-optical material, on which the modulating magnetic field acts, and analyzer (S. Gonda, D. Seko "Optoelectronics in questions and answers", Leningrad, Energoatomizdat, 1989, with pp.28–31). Shortcoming of this modulator is a small angle of turn of a polarization plane at small amplitude of a current, and in consequence a small level of modulation, or necessity, of use of a current with the large amplitude. For achievement enough large angles of the turn (of a polarization plane) ensuring an appreciable level of modulation (>20%), the solenoids with a plenty of coils, or large amplitudes of a current (about 1 A and more), or and that and another are required. A direct consequence of it is the low speed of operation. Use ferromagnetics in magneto-optical element s, as a rule, results in large losses. Shortcoming of modulators on the basis of magneto-optical Kerr effect is restriction on extreme small value of magnetization of domains determining maximal density of recording and/or reading the information. This results in impossibility of reduction of the sizes of the domains to below extreme allowable value, and thus limits density of record.

In the heretofore-known technical decisions the increase of a level of modulation (at moderate currents) is achieved by increase of the optical course of a beam within (magneto) optical element due to repeated reflection from end faces of the optical element (S. Gonda, D. Seko "Optoelectronics in questions and answers", Leningrad, Energoatomizdat, 1989, pp. 126–127), or increase of length of the optical element as such made as fiber-optic waveguide (S. N. Antonov, S. N. Bulyuk, V. M. Kotov "Faraday optical fiber gauge of a magnetic field", "Quantum electronics", 18, No. 1, 1991, pp.139–141). Both in that, and in the other case optical radiation losses grow considerably; besides the modulating variable current, passed through the solenoid, should be strong enough.

DISCLOSURE OF THE INVENTION

The technical result of the invention is expressed in sharp amplification of Faraday effect and achievement of a high level of modulation of optical radiation at rather small amplitudes of a current, and consequently, high speed of operation and low losses, and also in a possibility of reading of the information at higher density of record.

The put task is solved by that the modulator on the basis of Faraday effect, containing optically connected magneto-optical element passing optical radiation and separator of radiations of various polarizations, thereto the magneto-optical element consists of an optical element made from magneto-optical material, and the means creating a variable magnetic field in it, in addition is provided with a nonlinear-optical element located between the magneto-optical element and the separator of radiations of various polarizations.

For the even greater increase of a level of modulation the nonlinear-optical element has a birefringence and/or is made from a magneto-optical material and/or is made from optically active material.

In specific case, most preferable for constructive performance, the nonlinear-optical element is made as the nonlinear-optical waveguide.

Nonlinear-optical waveguide must be made with possibility of propagation in it at least two unidirectional distributively coupled waves of orthogonal polarizations, So in the most preferable case the nonlinear-optical waveguide has a birefringence and/or is made from a magneto-optical material and/or is made from optically active material.

A length of the nonlinear-optical waveguide is not less than the length, which is necessary for switching or transfer at least 10% of a power from one of unidirectional distributively coupled waves with mutually orthogonal polarizations to other unidirectional distributively coupled wave with orthogonal polarization, thereto the length of the nonlinear-optical waveguide, which is necessary for switching or transfer at least 10% of a power of one of said unidirectional distributively coupled waves to another wave with orthogonal polarization, is not exceed the length at which a power of the most attenuated (absorbed) wave from the unidirectional distributively coupled waves of orthogonal polarizations, is attenuated in 20 times or less.

As a rule, a length of the nonlinear-optical waveguide is not less than the length, which is necessary for switching or transfer at least 50% of a power from one of unidirectional distributively coupled waves with mutually orthogonal polarizations to other unidirectional distributively coupled wave with orthogonal polarization, thereto the length of the nonlinear-optical waveguide, which is necessary for switching or transfer at least 50% of a power of one of said unidirectional distributively coupled waves to another wave with orthogonal polarization, is not exceed the length at which a power:of the most attenuated (absorbed) wave from the unidirectional distributively coupled waves of orthogonal polarizations, is attenuated in 10 times.

Thereto, as a rule, the nonlinear-optical waveguide is made as singlemoded.

As a rule, the entrance and/or out put ends (faces). of the nonlinear-optical waveguide have antireflection coverings, in particular, the antireflection coating at ends (faces) of the nonlinear-optical waveguide can be formed lowering factor of reflection of radiation from input and/or output end face up to value no more than 1%.

In a case, when the modulated optical radiation is not polarized, or for, increase of a degree of laser radiation polarization. the modulator in addition contains a polarizer placed before the magneto-optical element.

In special cases the polarizer, mounted before the magneto-optical element, and/or separator of radiations of various polarizations, mounted after the nonlinear-optical waveguide in the course of the radiation beam, is made as a polaroid, or a polarizing prism, or a birefringent prism, or a directional coupler, separating radiations of different polarization, or a polarizer on the basis of single optical waveguide.

For choice and maintenance of the optimum difference between phases of the orthogonally polarized waves, the modulator in addition contains a birefringent element located between said magneto-optical and nonlinear-optical elements. It operates as phase compensator or phase controller.

In special cases the birefringent element is made as an electrooptical crystal supplied with electrical contacts, or waveguide from an electro-optical material supplied with electrical contacts, or phase plate, or a birefringent waveguide, or acousto-optic crystal, or a waveguide from acousto-optic material. For elimination of return influence of the radiations reflected from ends faces of the nonlinear-optical waveguide and other optical elements of the device on the source of optical radiation and the nonlinear-optical waveguide, before the magneto-optical element or at the output of the modulator the optical isolator is mounted; in particular, the optical isolator is made as an optical waveguide.

In specific case the function of separator of waves of various polarizations the nonlinear-optical waveguide as such or the optical isolator mounted at the output of the nonlinear-optical waveguide carries out.

As a rule, the means creating variable magnetic field, is made as the solenoid.

In special cases the nonlinear-optical waveguide is made from a semiconductor doped glass.

In special cases the nonlinear-optical waveguide is made as fiber-optic waveguide, in particular, as birefringent fiber-optic waveguide made from a semiconductor doped glass.

In specific case for increase of efficiency of input/output of radiation on entrance and/or a exit end face of the optic waveguide the lens can be formed and/or a gradan is mounted.

In special cases the magneto-optical element is connected to a nonlinear-optical element made as fiber-optic waveguide, by optical connector or by soldering or by welding or by splice or by glue or by means of tiny mechanical connector.

To provide the compactness of the device and its miniaturizing the magneto-optical element and nonlinear-optical element (made as optic waveguides) are made as one united optic waveguide; or the magneto-optical element, nonlinear-optical element (made as optic waveguide) and the separator of waves of various polarizations, representing waveguide polarizer, are made as one optic waveguide; or the modulator in addition contains an birefringent optical waveguide located between the magneto-optical element and nonlinear-optical element waveguide, and the magneto-optical element, the birefringent optical waveguide, the nonlinear-optical waveguide and separator of radiations various polarizations, representing waveguide polarizer, are made as one united optic waveguide.

In particular, to provide for compactness of the device and its miniaturizing the magneto-optical element and nonlinear-optical element (made as fiber-optic waveguides) are made as one united fiber-optic waveguide; or the magneto-optical element, nonlinear-optical element (made as fiber-optic waveguide) and the separator of waves of various polarizations, representing waveguide polarizer, are made as one fiber-optic waveguide; or the device in addition contains an birefringent optical waveguide located between the magneto-optical element and nonlinear-optical element waveguide, and the magneto-optical element, the birefringent optical waveguide, the nonlinear-optical waveguide and separator of radiations various polarizations, representing waveguide polarizer, are made as one united fiber-optic waveguide.

In the other special case preferable to constructive performance, the nonlinear-optical waveguide is made on the basis of semiconductor layered MQW-type structure with alternating layers containing at least two heterotransition, and the nonlinear-optical waveguide is made with an opportunity of distribution in it two unidirectional distributively coupled waves of various (as a rule with mutually orthogonal) polarizations, wavelength $\lambda_r$ of one-photon resonance and/or two-photon exiton resonance and/or band-gap resonance and/or half-band-gap resonance in the semiconductor structure of nonlinear-optical waveguide satisfies to the inequality $0.5\lambda_r \leq \lambda \leq 1.5\lambda_r$, where $\lambda$ is wavelength of at least one optical radiation entered into the nonlinear-optical waveguide.

In particular, the effective switching is reached when the nonlinear-optical waveguide is oriented relative to a vector of polarization of optical radiation entered the nonlinear-optical waveguide, in such a way that the vectors of an electrical field of the linearly polarized optical radiation entered the nonlinear-optical waveguide, or axis of an ellipse of polarization elliptically of the polarized optical radiation entered the nonlinear-optical waveguide, are directed at angle $\upsilon$, $-15° < \upsilon < 15°$ to <<fast>> and/or to <<slow>> axes of the nonlinear-optical waveguide. In particular, when the nonlinear-optical waveguide is oriented relative to a vector of polarization of optical radiation entered the nonlinear-optical waveguide, in such a manner that the vectors of an electrical field of the linearly polarized optical radiation entered the nonlinear-optical waveguide, or axis of an ellipse of polarization of the elliptically polarized optical radiation entered the nonlinear-optical waveguide, coincides with <<fast>> and/or <<slow>> axes of the nonlinear-optical waveguide.

The effective switching is reached also in case, when the nonlinear-optical waveguide is oriented relative to a vector of polarization of optical radiation entered the nonlinear-optical waveguide, in such a manner that the vectors of an electrical field of the linearly polarized optical radiation entered the nonlinear-optical waveguide, or axis of an ellipse of polarization elliptically of the polarized optical radiation entered the nonlinear-optical waveguide, are directed at a angle $30° < \alpha < 60°$ to <<fast>> and/or to <<slow>> axes of the nonlinear-optical waveguide. In particular, when the nonlinear-optical waveguide is oriented relative to a vector of polarization of optical radiation entered in the nonlinear-optical waveguide, in such a manner that the vectors of an electrical field of the linearly polarized optical radiation entered in the nonlinear-optical waveguide, or axis of an ellipse of polarization elliptically of the polarized radiation entered the nonlinear-optical waveguide, are directed at a angle 45° to <<fast>> and/or to <<slow>> axes of the nonlinear-optical waveguide.

For increase of efficiency of inodulation the nonlinear-optical waveguide is supplied with contacts for passing an electrical current through it; as a rule, the device contains a current source connected to electrical contacts of the nonlinear-optical waveguide; as a rule, the electrical current source is a constant current source providing the electrical current across the nonlinear-optical waveguide in operation (in service) with values from 0.5 mA to 10 mA, thereto the current spread from an average value in time does not. exceed 0.1 mA.

In particular, the semiconductor structure is made as alternating layers $GaAs/Al_xGa_{1-x}As$, or $In_xGa_{1-x}As/InP$, or $In_{1-x}Ga_xAs_yP_{1-y}/In_{1-x'}Ga_{x'}As_{y'}P_{1-y'}$, where $x \neq x'$ and/or $y \neq y'$, or $CdSe_{1-x}S_x/CdSe$ or $InAs_{1-x}Sb_x/InAs$, or $PbS_xSe_{1-x}/PbSe$, or $Ge_xSi_{1-x}/Si$ or alternating layers of other semiconductor materials.

As a rule, the input and/or output ends (faces) of the nonlinear-optical waveguide have antireflection coverings, in particular, the anti-reflected covering at ends (faces) of the nonlinear-optical waveguide can be formed lowering factor of reflection of radiation from entrance and/or output end face up to value no more than 1%.

To increase an efficiency of an input/output of radiation into the nonlinear-optical waveguide the optical elements for the input/output of radiation (hereinafter referred to as <<input/output elements>>) are mounted accordingly at input and/or an output of the nonlinear-optical waveguide, thereto the input/output elements are mounted relative to the nonlinear-optical waveguide with accuracy provided by their positioning by luminescent radiation of the nonlinear-optical waveguide, arising at passing electrical current through it.

The positioning and/or mounting input and/or output elements, made as objectives, relative to the nonlinear-optical waveguide is accomplished up until formation of collimated optical radiation beam outside (beyond) the said objectives. As a rule the collimated optical radiation beam has cylindrical symmetry.

In specific case to increase efficiency of radiation input/output the input/output elements are made as objectives, consisting from a cylindrical lens and/or gradan; as a rule, the surfaces of cylindrical lenses and/or gradans are clarified (antireflection coated).

In the other special case to increase the radiation input/output efficiency the input/output elements are made as input and/or output optical waveguides .(hereinafter referred to as <<input/output waveguides>>); as a rule, on input and/or output end face of the input and/or output optical waveguide the cylindrical lens and/or parabolic lens and/or conic lens is formed and/or a gradan is mounted, as a rule, input and/or output end faces of said waveguides and/or gradans are antireflection coated.

In special cases input waveguide contains waveguide connector, which can be made as at least one Y-connector or a directional coupler, in this case at least part of one input branch of the waveguide connector is the magneto-optical element made from magneto-optical material and placed in the solenoid.

To decrease optical radiation power, necessary for effective operation of the suggested modulator and to increase a depth of modulation the modulator in addition contains at least one Peltier element, one side of which is in thermal contact with the nonlinear-optical waveguide and at least by one sensor of temperature, thereto the sensors of temperature and Peltier element can electrically be connected to a temperature controller (regulator) of and/or to the temperature stabilizer.

Under this in the quality of said sensor of temperature they use a thermistor, and/or a thermocouple, and/or a sensor in the form of integrated circuit.

The modulator in addition contains in special cases at least one semiconductor laser and/or the laser module.

For a possibility of orientation of "fast" and "slow" axes of the nonlinear-optical waveguide relative to a electrical field vector of the linearly polarized radiation, or the axes of an ellipse of polarization of the elliptically polarized radiation, the semiconductor laser and/or the laser module, and/or magneto-optical element, and/or the nonlinear-optical waveguide with elements of input and output of radiation, and/or separator of radiations of various polarizations at the output of the device, and/or polarizer, mounted before the magneto-optical element, and/or optical isolator are connected among themselves by optic-fiber connectors and/or sockets providing for opportunity of turn of mentioned optical elements relative to each other around of longitudinal axis of the device.

In specific case they use fiber-optic connectors and/or sockets such as FC/PC.

For reduction of atmosphere fluctuation, noise and jamming at the output of the separator of the waves having different polarizations, the correlator and/or differential amplifier of optical radiation is set.

The separator of said UDCWs can be placed not only at the output of the nonlinear-optical waveguide immediately after (in close proximity to) output of the waveguide but can be removal from it. In some cases such removal separator is preferred.

Firstly it gives additional possibility for secret transmission of information by optical communications, say by air-path optical communications. The total power of all waves leaving the nonlinear-optical waveguide is not change in time and not modulated. But when they separated said UDCWs at the removal end of the optical communication line by means of said separator before the receivers they obtain modulation and amplified information signal.

Secondly it gives additional opportunity to clear the amplified information signal from noise, jamming and casual distortions. For reduction of noise the signals from the output of the separator can feed to the correlator, in which the common, but opposed in phases part of amplification of signals is separated out (by means of electronic differential amplifier) and, thus, noise and atmosphere fluctuations are cut. In other words, the dependences of powers on time of said unidirectional distributively coupled waves, separated after the output of said nonlinear-optical waveguide, are compared and their difference in powers is selected out by means of a correlator and/or electronic differential amplifier.

In other words the dependences of powers on time of said unidirectional distributively coupled waves, separated after the output of said nonlinear-optical waveguide, are compared and their amplified opposite modulation in powers is selected out by means of a correlator and/or differential amplifier.

The jamming cause sin-phase changing in powers of transmitted UDCWs through the atmosphere whereas in suggested device for modulation of optical radiation and transmitting the information the changing in powers of the UDCWs occur in opposite phases. So their difference in powers can be selected out by means of a correlator and/or differential (operation) amplifier. Under this the atmosphere fluctuations and jamming are rejected.

Thus the common part is selected out with taking into account the changing of the UDCWs are in opposite phases.

In special cases the optical element, comprised in magneto-optical element, is made as passing optical radiation, under this the means creating a variable magnetic field in it, is made as the device of moving of an optical element in space, or device of scanning of a beam of modulated radiation over an optical element.

In particular case the suggested modulator is provided with at least one additional focusing objective, e.g. made as a gradan and/or a lens, and mounted before said magneto optical element and/or before said nonlinear-optical element, and/or with at least one collimating objective, e.g. made as a gradan and/or a lens, placed after said magneto optical element and/or before said nonlinear-optical element.

The put task is solved also by that the modulator on the basis of magneto-optical of the Kerr phenomenon, comprising optically connected an optical element having sites of different magnetization and reflecting modulated optical radiation beam, and a separator of radiations of different polarizations. also the modulator is provided with a device for moving said sites of said optical element with different magnetization in space relative to said modulated optical radiation beam, or with a device of scanning said modulated optical radiation beam over the optical element, the modulator additionally contains the nonlinear-optical element, mounted between said optical element and said separator of radiations of different polarizations, thereto said nonlinear-optical element made with possibility of propagation in it at least two unidirectional distributively coupled waves of different polarizations, thereto the nonlinear coefficient of said nonlinear-optical element is larger than the threshold nonlinear coefficient, thereto a length of the nonlinear-optical element is not less than the length, which is necessary for switching or transfer at least 10% of power from one of said unidirectional distributively coupled waves to another unidirectional distributively coupled wave with different polarization, thereto the length of said nonlinear-optical element, which is necessary for switching or transfer at least 10% of power from one of said unidirectional distributively coupled waves to another unidirectional distributively coupled wave with different polarization, is not exceed the length at which power of the most attenuated wave, from said unidirectional distributively coupled waves of different polarizations, is attenuated by a factor 20 or less.

In more preferable case the length of the nonlinear-optical waveguide is not less than the length, which is necessary for switching or transfer at least 50% of a power from one of unidirectional distributively coupled waves with mutually orthogonal polarizations to other unidirectional distributively coupled wave with orthogonal polarization, thereto the length of the nonlinear-optical waveguide, which is necessary for switching or transfer at least 50% of a power of one of said unidirectional distributively coupled waves to another wave with orthogonal polarization, is not exceed the length at which a power of the most attenuated (absorbed) wave from said unidirectional distributively coupled waves of orthogonal polarizations, is attenuated by a factor 10.

In even more preferable case the length of the nonlinear-optical waveguide is not less than the length, which is necessary for switching or transfer more 90% of a power from one of unidirectional distributively coupled waves with mutually orthogonal polarizations to other unidirectional distributively coupled wave with orthogonal polarization, thereto the length of the nonlinear-optical waveguide, which is necessary for. switching or transfer more 90% of a power of one of said unidirectional distributively coupled waves to another wave with orthogonal polarization, is not exceed the length at which a power of the most attenuated (absorbed) wave from said unidirectional distributively coupled waves of orthogonal polarizations, is attenuated by a factor 10.

As a rule said unidirectional distributively coupled waves of different polarizations are the unidirectional distributively coupled waves having mutually orthogonal polarizations.

Usually said optical element is made as the form of disk, or in the form of plate.

As a rule, the suggested modulator is provided with at least one additional focusing objective, e.g. made as a gradan and/or a lens, and mounted before said magneto optical element and/or before said nonlinear-optical element, and/or with at least one collimating objective, e.g. made as a gradan and/or a lens, placed after said magneto optical element and/or before said nonlinear-optical element.

For the even greater increase of a level of modulation the nonlinear-optical element has birefringence and/or is made from magneto-optical material or optically active material.

In specific case, most preferable for constructive performance the nonlinear-optical element is made as the nonlinear-optical waveguide.

In a case, when the modulated optical radiation is not polarized, or for increase of a degree of polarization of laser radiation, the modulator in addition contains a polarizer located before the magneto-optical element.

For choice and maintenance of an optimum difference in phases of the orthogonal polarized waves the phase equaliser (compensator) and/or phase controller is mounted between the magneto-optical and the nonlinear-optical elements; in particular, the phase compensator is made as waveguide compensator. For choice and maintenance of an optimum input polarization at the input of nonlinear-optical element the polarization controller may be also used.

As a rule, the phase compensator is made as a birefringent element, placed between the magneto-optical element and the nonlinear-optical elements. Usually birefringent element is made as a birefringent optical waveguide, or a fiber-optic phase compensator, or a fiber polarization controller, or an optical waveguide made from electrooptical material, supplied with electrical contacts, or an electrooptical crystal, supplied with electrical contacts, or a phase plate, or an acousto-optical crystal, or an optical waveguide made from an acousto-optical material.

To eliminate return influence of reflected radiation on a source of optical radiation and the nonlinear-optical waveguide before magneto-optical element or at the output of the modulator the optical isolator is mounted, in particular, the optical isolator is made as optical waveguide.

In that specific case the function of separator of optical radiations having various polarizations the nonlinear-optical waveguide as such or optical isolator mounted at the output of the nonlinear-optical waveguide carries out.

As a rule, the nonlinear-optical waveguide is singlemoded.

In special cases the nonlinear-optical waveguide is made as fiber-optic waveguide.

In special cases the nonlinear-optical waveguide is made as nonlinear fiber-optic waveguide, in particular, as birefringent fiber-optic waveguide from a semiconductor doped glass.

In specific case for increase of efficiency of input/output of radiation on entrance and/or a output end face of the fiber-optic waveguide the lens can be made and/or gradan is mounted.

In special cases the magneto-optical element is connected to a nonlinear-optical element made as fiber-optic waveguide, by optical connectors, or by splice, or by welding, or by glue, or by means of tiny mechanical connector.

In the other special case preferable to constructive performance, the nonlinear-optical waveguide, is made on the basis of semiconductor layered structure such as MQW with alternating layers containing at least two heterotransition, and the nonlinear-optical waveguide is made with an opportunity of distribution in it two unidirectional distributively coupled waves having various polarizations, and wavelength of one-photon exiton resonance and/or two-photon exiton resonance and/or band-gap resonance and/or half-band-gap resonance in semiconductor layered MQW-type structure of the nonlinear-optical waveguide satisfies to the inequality $0.5\lambda_r \leq \lambda \leq 1.5\lambda_r$, where $\lambda$ is wavelength of at least one optical radiation entered the nonlinear-optical waveguide.

The more preferable case is that when $0.9\lambda_r \leq \lambda \leq 1.1\lambda_r$.

The birefringence of said structure is another clue factor (besides high nonlinear coefficient) of such structure which allow us to realize effective all-optical transistor on the basis of said structure, using self-switching of the UDCWs having orthogonal polarizations.

The effective switching is reached (achieved) in that case, when the nonlinear-optical waveguide is oriented relative to a vector of polarization of optical radiation entered in the nonlinear-optical waveguide, in such a manner that the vectors of an electrical field of the linearly polarized optical radiation entered the nonlinear-optical waveguide, or axis of an ellipse of polarization of the elliptically polarized optical radiation entered the nonlinear-optical waveguide, are directed at an angle of $-15°<\alpha<15°$ to <<fast>> and/or to <<slow>>axes of the nonlinear-optical waveguide. In particular, when the nonlinear-optical waveguide is oriented relative to the vector of polarization of optical radiation entered the nonlinear-optical waveguide, in such a manner that the vectors of an electrical field of the linearly polarized optical radiation entered in the nonlinear-optical waveguide, or axis of the ellipse of polarization of the elliptically polarized optical radiation entered the nonlinear-optical waveguide, coincide with <<fast>> and/or <<slow>> axes of the nonlinear-optical waveguide.

The effective switching is reached also in that case, the nonlinear-optical waveguide is orientated relative to a vector of polarization of optical radiation entered the nonlinear-optical waveguide, in such a manner that the vectors of an electrical field of the linearly polarized optical radiation entered the nonlinear-optical waveguide, or axis of an ellipse of polarization of the elliptically polarized optical radiation entered the nonlinear-optical waveguide, are directed at an angle $30°<\alpha<60°$ to <<fast>> and/or to <<slow>> axes of the nonlinear-optical waveguide. In particular, when the nonlinear-optical waveguide is orientated relative to the vector of polarization of optical radiation entered the nonlinear-optical waveguide, in such a manner that the vectors of the electrical field of the linearly polarized optical radiation entered the nonlinear-optical waveguide, or axis of an ellipse of polarization of the elliptically polarized optical radiation entered the nonlinear-optical waveguide, are directed at an angle of $45°$ to <<fast>> and/or to <<slow>> axes of the nonlinear-optical waveguide.

To increase the efficiency of modulation the nonlinear-optical waveguide is provided with contacts for passing an electrical current through it, as a rule, the modulator contains a current source of a connected to electrical contacts the nonlinear-optical waveguide; as a rule, the source of a current is a precision constant current source providing a current, passed through the nonlinear-optical waveguide in a mode of operation (i.e. in service) with values in the range from 0.5 mA up to 10 mA, thereto the current spread from an average value over the time does not exceed 0.1 mA.

In particular, the semiconductor structure is made as alternating layers $GaAs/Al_xGa_{1-x}As$, or $In_xGa_{1-x}As/InP$, or $In_{1-x}Ga_xAs_yP_{1-y}/In_{1-x'}Ga_{x'}As_{y'}P_{1-y'}$, where $x \neq x'$ and/or $y \neq y'$, or $CdSe_{1-x}S_x/CdSe$ or $InAs_{1-x}Sb_x/InAs$, or $PbS_xSe_{1-x}/PbSe$, or $Ge_xSi_{1-x}/Si$ or alternating layers of other semiconductor materials.

For increase of efficiency of an input/output of radiation optical elements of an input/output located accordingly at an input and/or an output of the nonlinear-optical waveguide, and the input and/or output elements are mounted relative to the nonlinear-optical waveguide with accuracy provided by their positioning (adjustment) by luminescent radiation the nonlinear-optical waveguide, arising at passing an electrical current through it.

In that specific case for increase of efficiency of input/output of radiation the elements of input and/or of an output are made as objectives, consisting from a cylindrical lens and/or gradan; as a rule, the surfaces of the cylindrical lenses and/or gradans have antireflection coatings.

In the other special case to increase efficiency of input/output of optical radiation the input and/or output elements are made as input and/or output optical waveguide; as a rule, on input and/or output end face of input and/or output optical waveguide the cylindrical and/or parabolic and/or conic lens is formed and/or a gradan is mounted; as a rule, the input and/or output end faces of the said optical waveguide and/or gradans are antireflection coated.

To decrease optical radiation power, necessary for effective operation of the suggested modulator and to increase a depth of modulation the modulator in addition contains at least one Peltier element, one side of which is in thermal contact with the nonlinear-optical waveguide and at least by one sensor of temperature, thereto the sensors of temperature and Peltier element can electrically be connected to a temperature controller (regulator) of and/or to the temperature stabilizer.

Under this in the quality of said sensor of temperature they use a thermistor, and/or a thermocouple, and/or a sensor in the form of integrated circuit.

The device in addition contains in special cases at least one semiconductor laser and/or the laser module.

For reduction of noise at the output of the nonlinear-optical waveguide the correlator of optical radiation is mounted.

THE BRIEF DESCRIPTION OF THE DRAWINGS

Figure 1A:
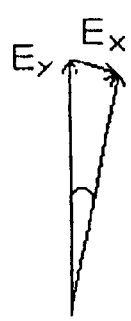
FIG. 1 shows schematically a small turn of a radiation polarization plane of (i.e. a vector of an electrical field $\vec{E}$) and initiation of a small <<signal>> x-component (a) of a electrical field vector at the output of the magneto-optical element. It also shows initiation of a difference between x-component and y-component of the electrical field vector at the output (b).

FIGS. 7(a) and (b) show the switching of orthogonally polarized solutions in a birefringent fiber nonlinear-optical waveguide with use of Faraday effect with initiation of a small <<signal>> x-component; y-component of the electrical field vector is directed along <<fast>> or <<slow>> axis; a possible and probable miss-match of group speeds of the solutions is taking into account. At the bottom profiles of the solutions at output section (at z=l) are shown.

FIGS. 8(a) and (b) show gain in percentage modulation due to self-switching of the UDCWs having orthogonal polarizations in said nonlinear-optical waveguide (on the top), and absence of modulation without said nonlinear phenomenon (below). In both cases Faraday effect is.

Modes for carrying out the invention

The effective and high-speed operation of the suggested modulator is based on the nonlinear-optic phenomenon of optical self-switching of unidirectional distributively coupled waves (UDCWs) having different polarizations, as a rule mutually orthogonal polarizations (A. A. Maier, "Optical transistors and bistable elements on the basis of nonlinear transmission of light in systems with unidirectional coupled waves", Kvantovaya Elektron. 9, pp.2296–2302 (1982); Sov. J. Quantum Electron. v.12, 1490 (1982); A. A. Maier. All-optical switching of unidirectional distributedly coupled waves. UFN 1995, v.165, N9, p.1037–1075. [Physics-Uspekhi v.38, N9, p.991–1029, 1995]; A. A. Maier. Experimental observation of the phenomenon of self-switching of unidirectional distributively coupled waves. UFN 1996, v.166, N11, p.1171–1196 [Physics-Uspekhi v.39, N11, p.1109–1135]).

Suppose that there is some nonlinear-optical element which may be made as an nonlinear-optical waveguide, or nonlinear crystal, or some transparent sample from nonlinear material, e.g., made in the form of cylinder, parallelepiped, cube or in another form. In the quality of the nonlinear material semiconductor layered MQW-type structure, or semiconductor doped glass, or nonlinear crystals, such as KTP, semiconductor crystals, or nonlinear organic materials or other materials can be used. If aforesaid UDCWs propagate in nonlinear-optical element, thereto input intensity is sufficiently large, namely larger than so called threshold intensity and/or is near to so called critical value, then under certain additional conditions the phenomenon of the UDCWs self-switching can occur, which consist in following. The slight change in polarization of input radiation or in its power or in difference of input phases causes the sharp change of the ratio between output powers of the UDCWs. Under this the change in intensity or in polarization in each coupled wave at the output is in many times larger than that at the input of the nonlinear-optical element.

For carrying the suggested modulator into effect the change in polarization of input radiation is of the most importance.

In the most preferable case for constructing the suggested modulator into effect the nonlinear-optical element is made as the nonlinear-optical waveguide. It is so due to high intensity of radiation in the optical waveguide (because of its small cross-section) and its rather large length.

The nonlinear-optical waveguide must be made with possibility of propagation in it at least two unidirectional distributively coupled waves of mutually orthogonal polarizations.

The distribution coupling of the UDCWs can be both linear and nonlinear. The linear distribution coupling between waves of mutually orthogonal polarizations takes place in a birefringent optical waveguide or in a magneto-optical waveguide (placed into solenoid through which electrical current is passed) or in an optically-active waveguide. In the case of birefringent nonlinear-optical waveguide the linear distribution wave-coupling is proportional to value of birefringence of the waveguide and also proportional to $\sin(2\theta)$, where $\theta$ is a vector between electrical field vector and <<fast>> or <<slow>> axis of the birefringent nonlinear-optical waveguide.

In the most preferable case for carrying out the suggested modulator the nonlinear-optical element is made as birefringent nonlinear-optical waveguide.

Theory shows that effective switching of UDCWs of orthogonal pollarizations can occur in birefringent nonlinear-optical waveguide in the case when $E_y \gg E_x$ (FIG. 1).

In particular case, this situation takes place if axis Y and electrical field vector $\vec{E}$ is directed angle $\theta=45°$ relative to the <<fast>> or <<slow>> axis of the nonlinear-optical element (waveguide) and the linear coupling between the UDCWs having polarizations X-axis and Y-axis is maximal; and sharp switching of power between of the UDCWs caused by initiation of slight x-component $E_x$ at the input of nonlinear-optical waveguide. This switching gives rise to large x-component at the output of the nonlinear-optical waveguide. Due to $E_x^2+E_y^2=$const this gives rise to amplification of turn of vector $\vec{E}$ after the optical radiation transmits through the nonlinear optical waveguide; in other words amplification of Faraday effect takes place.

In other particular case $\vec{E}_y$ is directed along <<fast>> or <<slow>> axis of the birefringent nonlinear-optical waveguide, i.e. $\theta=0$ (see FIG. 1). In this special case the linear wave-coupling between the UDCWs is absent (or is very small), but nonlinear destributive coupling is essential. According to the theory very sharp switching of the UDCWs takes place, thereto great gain is achieved. This switching also results in much larger x-component at the output of the nonlinear-optical waveguide; due to $E_x^2+E_y^2=$const this gives rise to amplification of turn of vector $\vec{E}$ after the optical radiation transmission through the nonlinear optical waveguide; in other words .

Figure 2:
FIG. 2 shows the block-diagram of the device.

In other case $E_y \approx E_x$ (see FIG. 2) sharp switching of power between the UDCWs caused by slight change in components of electrical vector and/or in input polarization of fed radiation also takes place according to the theory.

The essence is in the following. The slight change in polarization of the radiation at the input of the nonlinear-optical waveguide means change in the amplitudes $E_x$ and $E_y$ and hence in intensities $I_x$ and $I_y$ (certainly in powers $P_x$ and $P_y$ as well), and in the ratio between powers of the UDCWs having orthogonal polarizations at the input of the nonlinear-optical waveguide. And according to the theory (A. A. Maier. All-optical switching of unidirectional distributedly coupled waves. UFN 1995, v.165, N9, p.1037–1075. [Physics-Uspekhi v.38, N9, p.991–1029, 1995]) this gives rise to abrupt change in the ratio of UDCWs powers at the output of the system. Thus the output change in the ratio $E_x/E_y$ is much more than that at the input of the system. I.e. optical switching of UDCWs takes place. If absorption and other losses are absent, then under this switching $P_x+P_y=$ const ($E_x^2+E_y^2=$const) along the nonlinear-optical waveguide and hence, if the UDCWs are separated at the output of the nonlinear-optical waveguide, providing the coupling and interaction between them, then change in intensity of each separated wave is much more than that at the input of the nonlinear-optical waveguide. The modulation of output power is achieve much greater than that without the nonlinear-optical waveguide. Said separation can achieve by a polarizer.

Theoretical estimations and experiments show that a length of the nonlinear-optical waveguide should be not less than the length, which is necessary for switching or transfer at least 10% of a power from one of unidirectional distributively coupled waves with mutually orthogonal polarizations to other unidirectional distributively coupled wave with orthogonal polarization, thereto the length of the nonlinear-optical waveguide, which is necessary for switching or transfer at least 10% of a power of one of said unidirectional distributively coupled waves to another wave with orthogonal polarization, should be not exceed the length at which a power of the most attenuated (e.g., absorbed) wave from the unidirectional distributively coupled waves of orthogonal polarizations, is attenuated decreased in 20 times.

The more preferable embodiment takes place if the length of the nonlinear-optical waveguide should be not less than the length, which is necessary for switching or transfer at least 50% of a power from one of unidirectional distributively coupled waves with mutually orthogonal polarizations to other unidirectional distributively coupled wave with orthogonal polarization, thereto the length of the nonlinear-optical waveguide, which is necessary for switching or transfer at least 50% of a power of one of said unidirectional distributively coupled waves to another wave with orthogonal polarization, should be not exceed the length at which a power of the most attenuated wave from the unidirectional distributively coupled waves of orthogonal polarizations, is attenuated by a factor 10.

The even more preferable embodiment takes place if the length of the nonlinear-optical waveguide should be not less than the length, which is necessary for switching or transfer more 80% of a power from one of unidirectional distributively coupled waves with mutually orthogonal polarizations to other unidirectional distributively coupled wave with orthogonal polarization, hereto the length of the nonlinear-optical waveguide, which is necessary for switching or transfer more 80% of a power of one of said unidirectional distributively coupled waves to another wave with orthogonal polarization, should be not exceed the length at which a power of the most attenuated wave from the unidirectional distributively coupled waves of orthogonal polarizations, is attenuated by a factor 10.

Under certain conditions, the turn of the vector $\vec{E}$ at the input of nonlinear-optical element can also give rise to change of coefficient of distribution coupling between the UDCWs. It also can results in switching of UDCWs and in amplification of modulation. It can take place, for example, if in the quality of the nonlinear-optical element the tunnel-coupled optical waveguides (each of which is birefringent) are used; then due to the turn of the vector $\vec{E}$ at the input of the nonlinear-optical waveguide said coefficient of distribution coupling can change.

To achieve effective operation of the suggested modulator under rather small input power, the sufficient large nonlinear coefficient of the nonlinear-optical element is needed. To carrying the suggested modulator into effect under certain sufficiently small input radiation power the nonlinear factor of the nonlinear-optical element must be larger than the threshold value. This value depends on the linear wave-coupling coefficient and the input power fed into the non-linear optical element. Usually it is proportional to the linear wave-coupling coefficient and to the input power fed into the nonlinear-optical element.

The threshold value of the nonlinear-optical coefficient can be defined as the value of the nonlinear coefficient of the nonlinear-optical element (having length l), under exceeding of which, at least one absolute value of at least one differential gain $\partial P_{xl}/\partial P_{x0}$, $\partial P_{yl}/\partial P_{y0}$, exceeding 1.05 exists, where: $P_{xl}$ is power of x-component, i.e. of wave having polarization along x axis, at the output (i.e. at z=l) of the nonlinear-optical element (usually made as waveguide); $P_{yl}$ is power of y-component, i.e. of the wave having polarization along y axis, at the output (i.e. at z=l) of the nonlinear-optical element; $P_{x0}$ is power of x-component, i.e. of wave having polarization along x axis, at the input (i.e. at z=0) of the nonlinear-optical element; $P_{y0}$ is power of y-component, i.e. of wave having polarization along y axis, at the input (i.e. at z=0) of the nonlinear-optical element.

The threshold value of the nonlinear-optical coefficient can be also defined as the value of the nonlinear coefficient of the nonlinear-optical element, under exceeding of which, the percentage modulation at the output of the modulator is in 1.05 times greater than that without the nonlinear-optical element.

To decrease the threshold nonlinear coefficient the nonlinear-optical element is usually made as the nonlinear-optical waveguide. The nonlinear coefficient of the nonlinear-optical waveguide depends on the value of nonlinear coefficient of a material of the nonlinear-optical waveguide and also on other properties of the nonlinear-optical waveguide, especially on the effective area of cross-section of the nonlinear-optical waveguide.

The modulator comprises: magneto-optical element 1, consisting of optical element 2, made from magneto-optical material and means 3, creating variable magnetic field in said optical element 2; a nonlinear-optical element 4, as a rule made as the nonlinear-optical waveguide with birefringence, or as a magneto-optic or as an optically active waveguide; a separator 5 of radiations having various (as a rule, orthogonal) polarizations at the output of the device; as a rule, the separator is made as a polariser, e.g., in the form of optical waveguide, or a polarizing prism, or a birefringen prism, or a polaroid; a birefringent element 6; a polarizer 7. Into the input of the device the optical radiation from the laser or laser module 8 is fed (FIG. 1, 2).

Figure 3:
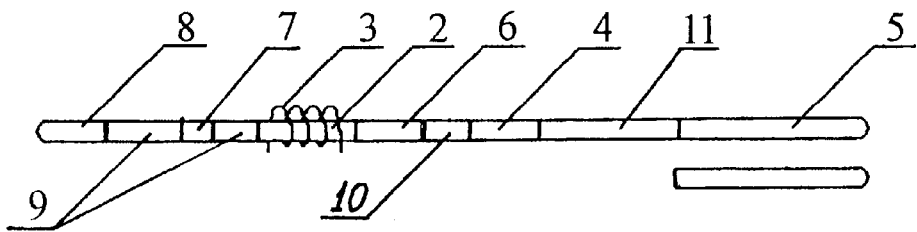
FIGS. 3–5 shows some variants of performance of the modulator on the basis of Faraday effect.

The modulator on the basis of Faraday effect can be made as the united nonlinear-optical module on the basis of united optical waveguide (FIG. 3), in particular on the base of united fiber-optic waveguide. In other words it can be formed as an integral unit. The part of the united optic waveguide 2, placed in the solenoid 3, is made from magneto-optic material. Thus the optical waveguide 2 is the optical element of said magneto-optical element 1, and the solenoid is said means 3 creating variable magnetic field in said optical element 2. The second part of the united optic waveguide represents—birefringent optic waveguide 6. The third part of the united optic waveguide represents the nonlinear-optical waveguide 4 made as a birefringent or as a magneto-optic or as an optically active waveguide; and the fourth part of the united optic waveguide is one of the branches of a directional coupler separating radiation orthogonal polarizations (which in this case is used as the separator 5 of radiations of various polarizations). The part of the united optical waveguide can operate in the quality of polarizer 7. I.e. in this case the polarizer 7 is made in the form of optical waveguide 7.

Besides it is possible to use additional optical waveguides 9, 10, 11 for feeding or transmission (9) and/or input (10) or output (11) of optical radiation, on the ends of which the lenses can be formed, which surfaces can be antireflection coated. Under this the input waveguide 10 can serve for feeding the radiation into the nonlinear-optical waveguide 4, and output waveguide 11 can serve for feeding the optical radiation out from the nonlinear-optical waveguide 4. In principle, the waveguides 9–11 play subsidiary role and their functions can perform other optical waveguides or elements. In particular, the waveguide 6 can perform the function of the waveguide 10, and the separator 5 made as optical waveguide can perform the function of the waveguide 11.

Formation of the aforesaid parts can be achieved by doping with various ions. For example, the waveguide 2 placed in the solenoid for amplification of magneto-optical properties (i.e. of constant Verdet) is doped by terbium, and the part of the united waveguide following it, is doped by semiconductors (e.g., $CdS_xSe_{1-x}$) for increasing the nonlinear factor of the nonlinear-optical waveguide. Under this the laser 8 can also be made as waveguide. In this case the <<laser>> part of the united optical waveguide can comprise an erbium doped fiber-optic waveguide. In particular it can be done as a fiber-optic source module including semiconductor laser and/or an erbium doped fiber amplifier (EDFA). The said fiber-optic source modules can provide the modulator for radiation with wavelengths 1.31 μm, 1.55 μm needed for practice use in fiber optics communications.

The optical waveguide 2, operating as the optical element of the magneto optical element 1, can be placed inside of one or several solenoids 3.

Figure 4:
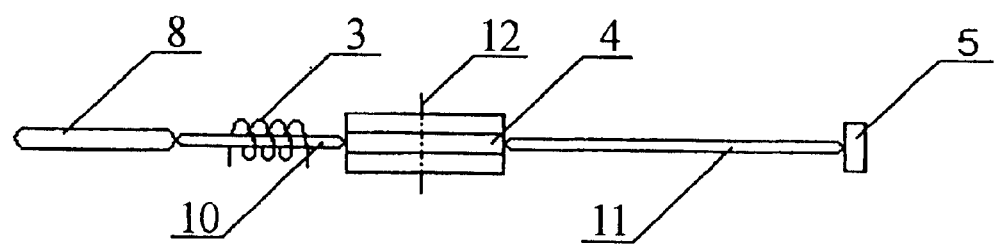
Figure 5:
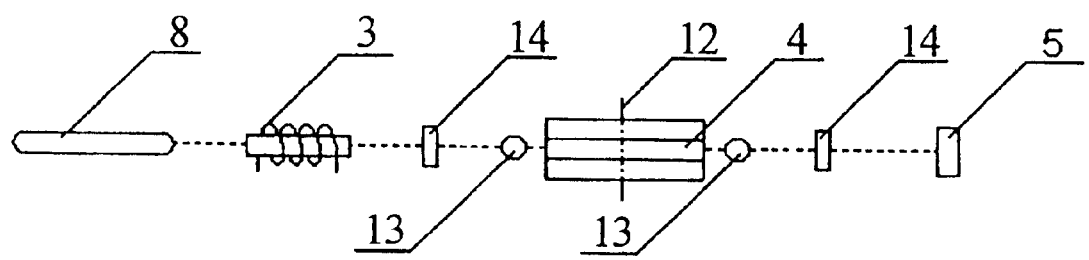

The modulator on the basis of Faraday effect can be formed with nonlinear-optical waveguide 4 made on the basis of semiconductor layered MQW-type structure, supplied with electrical contacts 12 for passing (carrying) current through the nonlinear-optical waveguide (FIG. 4–5). Said layered MQW-type structure contains not less than two layers. The nonlinear-optical waveguide 4 can be in thermal contact with one of sides (plates) of thermo-electrical Peltier element and with at least one sensor of temperature for the opportunity of a choice, controlling and stabilization of temperature of the nonlinear-optical waveguide. Under this said sensor of temperature can be made as a thermistor, and/or a thermocouple, and/or a sensor in the form of integrated circuit, say, AD 590 or LM 335.

To increase efficiency of the input/output of radiation into the nonlinear-optical waveguide the <<input/output elements>> are mounted accordingly at input and/or output of the nonlinear-optical waveguide, thereto the input/output elements are mounted relative to the nonlinear-optical waveguide with accuracy provided by their positioning (adjustment) by luminescent radiation of the nonlinear-optical waveguide, arising at passing electrical current through it.

In the special case the input/output elements are made as the input waveguide 10 and/or the output waveguide 11; as a rule, on the input/output waveguides ends (faces) adjacent to the nonlinear-optical waveguide the cylindrical lens and/or parabolic lens and/or conic lens is made and/or a gradan is mounted; as a rule, input and/or output end faces of said waveguides and/or gradans are antireflection coated.

As a rule, the input and/or output optical waveguides are made in the form of fiber-optic waveguides. At the end faces of the fiber-optic waveguides the lenses can be made.

Fiber-optic waveguide from magneto-optical glass can be joined with the output of the semiconductor laser diode and/or input end (face) of the nonlinear-optical waveguide (which can be antireflection coated), as shown in FIG. 4. Besides it is possible to use additional input/outputs optic waveguides 10, 11, on the ends of which the lenses can be formed, which surfaces can be clarified (antireflection coated). As shown in FIG. 4 the fiber-optic waveguide from magneto-optical glass (or its part) can be the optical element 2 of magneto-optical element 1 and in the same time said fiber-optic waveguide (or its part) can operate as the input waveguide 10, i.e. the input element.

In other specific case the input/output elements are made as objectives, consisting from a cylindrical lens 13 and/or gradan 14; as a rule, the surfaces of cylindrical lenses and/or gradans are antireflection coated.

In particular, the nonlinear-optical waveguide made on the basis of layered MQW-type structure provided with electrical contacts 12 can be also supplied with input and/or output gradan 14 and cylindrical lens 13, and the input and/or output surfaces of the gradans and cylindrical lenses are preferred to be antireflection coated.

The united nonlinear-optical module can contain also the polarizer and/or the optical isolator, which is used for reduction of ellipticity and/or increasing of polarization degree of radiation entered the nonlinear-optical waveguide. The optical isolator also eliminates or strongly reduces the transmission in the opposite direction, (to the laser) of radiation, reflected from ends (faces) of the nonlinear-optical waveguide and other optical elements. The optical isolator can carry out function polarizer.

Polarizer 7 and/or isolator settle down before the input of the magneto-optical element 1 and/or at the output of the nonlinear-optical waveguide 4; the device can contain several polarizers and/or optical isolators.

For providing the required difference of phases between the UDCWs of mutually orthogonal polarizations before the input of the nonlinear-optical waveguide the phase equaliser can be used which can be made as the birefringent optical waveguide 6.

The modulator can contain input waveguide connector, in particular, Y-connector. In this case into one of branches of the waveguide connector the pump optical radiation is fed; other branch contains a piece of optical waveguide, made from a magneto-optical material and placed into the solenoid 3. In this case in each input branch of the waveguide connector the optical isolator, and/or the polarizer, and/or phase equaliser (compensator) can be located.

It is extremely convenient to carry out turn of a vector of an electrical field of radiation entered the nonlinear-optical waveguide, relative to <<fast>> and <<slow>> axes of the nonlinear-optical waveguide with the help of azimuth turn of fiber-optic waveguide in a fiber optical socket consisting from two connectors (for example, such as FC/PC) and connecting socket or similar optical waveguide connection. Under such turn it is possible to avoid change of absolute value of amplitude of the field, i.e. entered optical power. Such turn provides additional opportunity to choice and regulate (adjust) the angle position between <<fast>> or <<slow>> axes in the nonlinear-optical waveguide and the electrical field vector of the input radiation. The said choice and adjusting in its turn gives the additional possibility to choice optimal conditions for operation of the modulator.

Fiber-optic waveguide from magneto-optical glass can be connected to the output of the semiconductor laser diode and/or with the input end face of the nonlinear-optical waveguide by means of a fiber optical connector (socket). In the device the opportunity of turn entrance polarizer is provided also; that also provides an opportunity for controlling of process of switching by regulation of UDCWs amplitudes of orthogonal polarizations on the input and the ratio α/K. However turn of the polarizer without the appropriate turn of a vector of the electrical field of the optical radiation, falling on the polarizer, is accompanied by change in power radiation entered the nonlinear-optical waveguide.

The nonlinear-optical module can be connected to the semiconductor laser or laser module 8, which can be formed with the external resonator, one mirror of which is made as the Bragg reflector. The Bragg reflector can represent corrugation in the optical waveguide or periodic grating of refractive index in the fiber-optic waveguide, contiguous to the laser. The external resonator provides stability of wavelength of radiation in the course of time and narrow enough width of a line of laser radiation (no more than 3 Å).

The modulator on a basis of the Kerr magneto-optical phenomenon (FIG. 6) can be made as an optical disk 15, covered by a thin film made, for example, from MnBi, ortho-ferrites, CdTbFe, having sites of magnetization, perpendicular to surface. The optical disk is supplied with the device of turn of the disk relative to the beam of reading laser radiation, or a device of scanning of this beam relative to disk (on the drawing said devices are not shown). After the optical disk in the course of the beam reflected from the disk, the nonlinear-optical waveguide 4 is mounted (the nonlinear-optical waveguide is made as fiber-optic waveguide or optical waveguide on the basis of MQW-structure); and separator 5 of radiations of various polarizations. Before the optical disk on the way of a beam falling on disk, the polarizer 7 can be mounted. The realization of the polarizer 7, the phase equaliser (birefringent element) 6, input/output elements 10, 11, 13, 14, the nonlinear-optical waveguide 4, the separator of radiations of various polarizations 5, and also optical isolator is similarly to described in the device on the basis of Faraday effect.

Let's consider operation of the modulator on the basis of Faraday effect.

To increase the degree of polarization the linearly polarized laser radiation passed through the polarizer (e.g., polaroid) and/or optical isolator, is passed through a magneto-optical element (called also magneto-optical element), representing an optical element constructed in the form of the optical waveguide, or a cylinder, or a parallelepiped, or a disk, or a plate made from magneto-optical material, e.g., glass doped with terbium, placed in the solenoid. Through the solenoid the variable electrical current is passed, which change corresponds to the useful (modulating) variable signal (analog or digital). The value and sign of an angle of a deviation (turn) of a plane of polarization of optical radiation from initial angle position, for example, from the vertical axis (at the output of a magneto-optical element) corresponds to value and sign of an electrical current through the solenoid, and, hence, to value and sign of the useful signal. As the horizontal component of a vector of a field at small angles of a deviation (turn) from a vertical is proportional to a angle of a deviation (turn), and the vertical component does not vary almost (FIG. 1a), it is possible to consider, that into the input of the nonlinear-optical waveguide (made, e.g., on the basis of MQW-type structure), having birefringence (under this the axes of the refractive index ellipse in cross-section of the nonlinear-optical waveguide are directed along axes x and y), the variable signal with the vector of polarization directed along the horizontal axis x, and carrying the useful information is fed. Simultaneously into the same nonlinear-optical waveguide the pump radiation is fed; which role in this case carries out the vertically polarized component, almost constant on intensity and almost equal to entrance intensity of radiation. The intensity of pump radiation should exceed the threshold value determined by the parameters of the nonlinear-optical waveguide, namely, by difference of effective refractive indices of waves having orthogonal polarizations, which is proportional to the value of birefringence of the waveguide, and by nonlinear factor of the waveguide. If input power is predetermined then threshold value of nonlinear coefficient is under consideration.

Figure 1B:
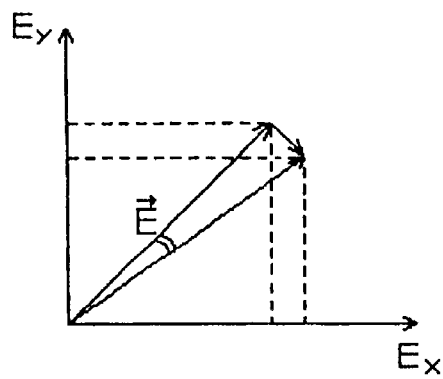

In the other case the electrical field vector of the optical radiation at the output of the magneto-optical element is directed at the angle of 45° to the x and y axes at a zero current through the magneto-optical element, i.e. intensities of the waves polarized along the y and x axes at the input of the nonlinear-optical element are equal to each other (FIG. 1b). The alternating current causes a deviation of the electrical field vector from the initial angle position (not changing its value), and thereby increases the x-component and reduces the y-component (or vice versa), creating a difference in intensities between the waves polarized along y and x axes at the input of the nonlinear-optical element. Under this at the output of the nonlinear-optical element this difference grows in many times.

In the nonlinear-optical waveguide there is an amplification of the modulated signal due to nonlinear interaction and power exchange between the UDCWs having orthogonal polarizations and sharp redistribution of energy between them at the output by small variation of the current through the magneto-optical element.

Power transfer factor from one of the UDCWs to another one depends on the difference between effective refractive indices of these waves (or on the difference between phase velocities of these waves).

Birefringence or magneto-optical activity, or optical activity of the nonlinear-optical element can be insignificant or equal to zero at all. I.e. the nonlinear-optical element may not have birefringence or magneto-optical activity, or optical activity; but in this case the gain of modulation and power transfer coefficient between the UDCWs of orthogonal polarizations are much less than in the case of significant birefringence, or magneto-optical activity, or optical activity of the nonlinear-optical element.

After passage through the magneto-optical element the radiation can be passed through an electrooptical element, to which an electrical voltage is applied. The choice of the value of this voltage carries out the choice of the optimum difference between the phases of the orthogonally polarized UDCWs at the input of the nonlinear-optical waveguide.

The nonlinear-optical waveguide made on the basis of the layered MQW-type structure can be supplied with electrical contacts allowing to pass an electrical current through (preferably across) the nonlinear-optical waveguide.

As a rule, the layered MQW-type structure of nonlinear-optical waveguide is grown so that the wavelength of one-photon and/or two-photon exiton resonance in said layered MQW-type structure of said nonlinear-optical waveguide, is close to the wavelength of radiation since thus nonlinear factor of the nonlinear-optical waveguide is maximal; and, hence, most effective modulation is provided. However absorption of radiation on wavelength of the exiton resonance is maximum. That is why through the nonlinear-optical waveguide (in a cross direction) the electrical current is passed. The current ensures decrease (reduction) of the absorption near to resonant area at least in two times in comparison with a case of absence of the said current. For the account transmission of a current approach population of the top and bottom levels and the absorption falls, and, thus, sharply reduces critical intensity and threshold intensity of optical radiation entered in waveguide.

The nonlinear-optical waveguide made on basis of the layered MQW-type structure can be supplied with input and/or output cylindrical lens 13 and gradan 14 mounted at the input and/or at the output of the nonlinear-optical waveguide 4 (as shown in FIG. 5), with the help of the which the optical radiation is effectively fed into the nonlinear-optical waveguide 4. The presence of electrical contacts allows to pass through structure an electrical current causing its luminescence, that allows to position and mount the cylindrical lens and gradan relative to the nonlinear-optical waveguide; or to join with the nonlinear-optical waveguide with input/output optical waveguide with the large degree of precision.

The positioning and/or mounting input and/or output elements, made as objectives, comprising the cylindrical lens 13 and gradan 14 relative to the nonlinear-optical waveguide is accomplished (done) up until formation of collimated optical radiation beam outside (beyond) the said objectives. As a rule the collimated optical radiation beam has cylindrical symmetry.

Fed from the nonlinear-optical waveguide based on the MQW-type structure the optical radiation is passed, for example, through a specially made directional coupler, or one specially made optical waveguide, or a polaroid, or a birefringent prism, or a polarizing prism (e.g. Glan prism), separating orthogonally polarized waves at the output of the device.

Under this each of specified-of the orthogonally polarized waves at the output of system appears modulated on intensity according to modulation of the current, passed (carried) through the solenoid, and the depth of modulation of radiation in each polarization at the output of the device in many times exceeds the depth of modulation of radiation in comparison with a case of absence of the nonlinear-optical waveguide.

For operation of the suggested (offered) device the turn of the vector of polarization at the output of the magneto-optical element in principle can be very small (for e.g., at an angle less than 1°). Under this the deviation of the-electrical field vector from its initial position (i.e. the vertical axis in this case) is much less than the vector length itself, i.e. at the output of the magneto-optical element the maximal horizontal component of the electrical field vector is much less than its vertical component, which almost does not change by its value and remains almost equal to the length of the complete electrical field vector (as shown in FIG. 1a).

Figure 7:
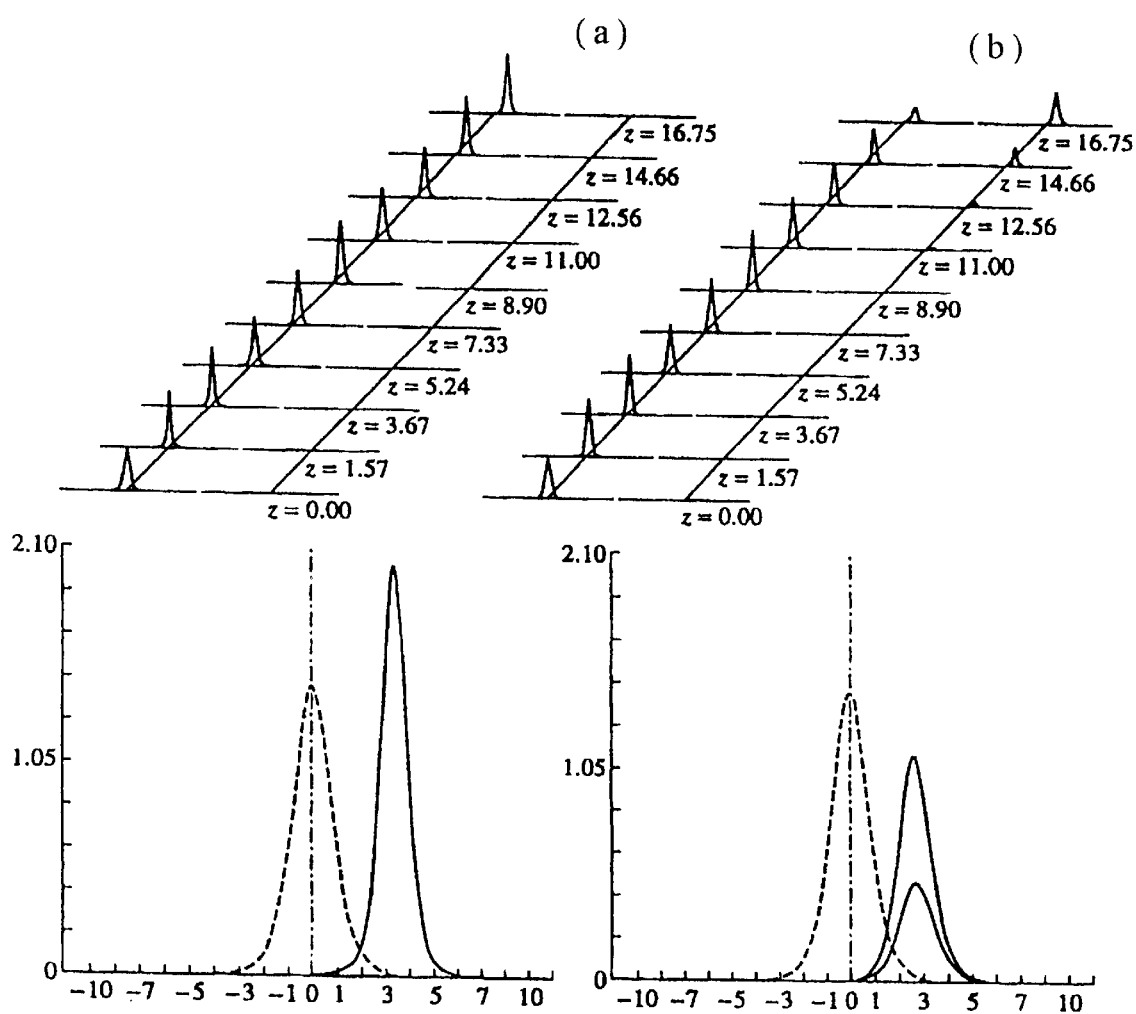

The offered modulator allows to modulate radiation transmitted as solutions in fiber-optic waveguide, that is illustrated by FIG. 7, showing the propagation of solutions having orthogonal polarizations along the birefringent fiber-optic cubic-nonlinear waveguide: in a case (a) the input amplitude of a soliton-like pulse polarized along the x axis is equal to zero; in case (b) it is equal to $10^{-2}$; in both cases input amplitude of the soliton-like pulse polarized along the y axis, is equal to 1.2 (in soliton normalization).

Figure 6:
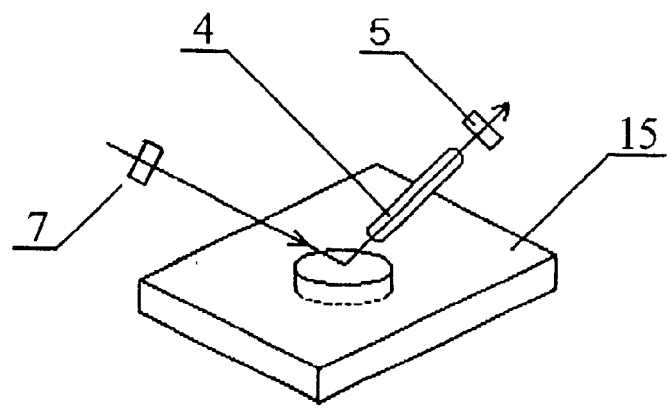
FIG. 6 shows the variant of performance of the modulator on the basis of magneto-optical Kerr phenomenon.

Similarly to the described above modulator (on the basis of the Faraday effect) the modulator on the basis of magneto-optical Kerr phenomenon operates. In this case the modulation of optical radiation is carried out under action of a variable magnetic field of the variously magnetized sites of the reflecting optical element of the magneto-optical disk made from a magneto-optical material (as shown in FIG. 6); that allows to read out the information which has been recorded with density, considerably exceeding the density of the record for heretofore-known reading devices.

About Optical Radiation Sources.

In the quality of the source of optical radiation fed into said nonlinear-optical waveguide a laser can be used. It is preferred to use tunable by wavelength, single-mode laser (i.e. with cross-single-mode), with narrow spectrum-line width (usually not larger than 20 A). E.g., the dye laser can be used. One of the best variants is the single-frequency laser. In other case mode-locked laser can be used. In particular, soliton laser can be used, e.g. providing with a continuous sequence of solutions, or soliton-like supershort pulses with constant peak power.

The wavelength of optical radiation of the laser is to be close to wavelength of exiton resonance of the semiconductor structure of said nonlinear-optical waveguide(s). Compactness of the laser is also important.

So the most preferable source of optical radiation fed into said nonlinear-optical waveguide(s) is a semiconductor laser or even better semiconductor laser module. The semiconductor laser module can be done firstly as air-path module with use of a cylindrical lens and a gradan for obtaining a collimated optical radiation beam. Secondly a semiconductor laser module can be done as a waveguide laser module, usually as fiber-optic source module. In this case an output of optical radiation from a laser diode is done through a fiber-optic waveguide adjoined to the laser diode. Usually a lens is done at the end of the fiber-optic waveguide adjoined to the laser diode. Usually the lens is done as parabolic, conic, or cylindrical. At another end of the fiber-optic waveguide a gradan can be mounted, which gives a collimated beam. The laser module in the form of a fiber-optic source module can include a fiber-optic amplifier, say an erbium doped fiber amplifier.

In both cases the semiconductor laser module is additionally supplied with at least one thermoelectric Peltier element (i.e. thermoelectric cooler), a side of which is in thermal contact with the radiating semiconductor structure of the laser (i.e. laser diode) and with at least one sensor of the temperature, thereto at least one sensor of temperature and at least one thermoelectric Peltier element are electrically connected to a controller and/or stabilizer of temperature. It is also preferred to supply said laser module with a precision current source for passing electrical current through its laser diode; usually said current source is made as a controller (driver) and/or stabilizer of the current. The optical power of the semiconductor laser or laser module is controlled and/or stabilized. It is done by controlling and stabilization of electrical current passing through the laser diode and/or by measuring and taking into account the output power of the laser diode, with use of an electrical feedback scheme and with use the precision current source made as the controller and stabilizer of the current through the laser diode; and hence the output power is controlled and stabilized. The measuring of the output power of optical radiation of the laser diode is done by measuring of current of a monitoring photo-diode.

The semiconductor laser or more preferably the semiconductor laser module can be comprised in the suggested device for modulation of optical radiation and transission of information.

The semiconductor laser or laser module can operates in different regimes, its output radiation can be both in the form of pulses and in the form of continues waves. It can operate both as mode-locked and continues waves laser or laser module. If it gives optical pulses, say ultra-short pulses, then the controller (driver) and stabilizer of current through the laser diode controls and stabilizes an average output power of the laser or laser module in time.

One of the most preferable regime of operation of the semiconductor laser or laser module comprised in the suggested device is continues waves regime.

As a rule the semiconductor laser and/or laser module is used with spectrum-line width of radiation, which is not more than 20 A. The semiconductor laser or the laser module is needed to be single-moded, i.e. its output optical radiation has one cross mode. In one of the most preferable variants the semiconductor laser and/or the laser module is made as a single-frequency laser module, say a single-frequency waveguide laser module; e.g., as a single-frequency and single-mode fiber-optic source module.

To obtain a narrow spectral line width and a stable frequency in time the semiconductor laser or the laser module is made with an external resonator and/or includes a dispersive element. The dispersive element can be made in the form of a diffraction grating. As a rule at least one mirror of the external resonator is made as a periodical grating, representing a partially or fully reflecting Bragg reflector. In particular, the mirror of the external resonator of the semiconductor laser and/or the laser module, including the semiconductor laser and an optical waveguide, is made in the form of a periodical grating of refractive index in the optical waveguide adjacent to the laser, or as a corrugation on a surface of the optical waveguide adjacent to the laser. E.g., the mirror of said external resonator is made as a refractive index periodical grating in the fiber-optic waveguide adjoined to the laser diode, thereto the laser diode end closest to said fiber-optic waveguide has an antireflection coating and another end of said laser diode has a reflection coating. In such way single frequency and single-moded fiber-optic semiconductor laser module is obtained and used; its spectral line width is less than 3 A. The semiconductor laser and/or the laser module with distributed feedback can also be used.

The power of laser must be more than threshold power. If a nonlinear coefficient of a nonlinear element is predetermined, then the threshold power (intensity) can be defined as an optical radiation power at the input of the nonlinear-optical element (waveguide), under exceeding of which the percentage modulation at the output of the device is in 1.05 times greater than that without the nonlinear-optical element (waveguide). As the nonlinear coefficient of the nonlinear-optical element (waveguide) is supposed to be chosen larger than threshold value, then it follows that the used laser or laser module has an output power more than threshold.

However the most preferable embodiment of the suggested device is achieved when the suggested device comprises a laser or laser module as a source of optical radiation, thereto the output power of the laser or laser module should be near to so called critical power (see e.g., A. A. Maier. All-optical switching of unidirectional distributedly coupled waves. UFN 1995, v.165, N9, p.1037–1075. [Physics-Uspekhi v.38, N9, p.991–1029, 1995]), corresponding to so called Middle point M of self-switching of UDCWs. The critical power can be defined as the power at the nearest region of which the greatest differential gain of modulation and amplification is achieved with use of the nonlinear-optical element (waveguide), thereto linearity of the modulation takes place. In the case of UDCWs having orthogonal polarisations and propagating in the birefringent cubic-nonlinear-optical element (waveguide) $P_M=4K/|\theta|$, where K is a coefficient of the distribution coupling of UDCWs having orthogonal polarisations, and $K \equiv |n_o-n_e|\sin(2\theta)$, $\theta$—angle between polarization of one of UDCWs and <<fast>> or <<slow>> axes of the nonlinear-optical element (waveguide). The value $|n_o-n_e|$ is value of the birefringence of the nonlinear-optical element (waveguide). $\theta$ is cubic nonlinear coefficient of nonlinear-optical waveguide. Usually critical power is larger than the threshold power.

Critical power corresponds to critical intensity: $P_M=SI_M$ (where S is a cross section area of a nonlinear-optical waveguide).

The power of optical radiation of laser or laser module comprising in the device is chosen in the range from 0.5 $P_M$ up to 1.5 $P_M$, where $P_M$ is the critical power. In more preferable case the power of optical radiation of laser or laser module comprising in the device is chosen in the range from 0.9 $P_M$ up to 1.1 $P_M$.

In other preferable case the power of the laser or laser module is to be larger than $3|n_o-n_e|/|\theta|$, say $5|n_o-n_e|/|\theta|$. This case, in particular, corresponds to orientation of electrical vector when $E_y \gg E_x$, and $\vec{E}_y$ is directed along <<fast>> or <<slow>> axis of the birefringent nonlinear-optical waveguide, i.e. $\theta=0$ (see FIG. 1). In this special case the linear wave-coupling between the UDCWs is closed to zero, but nonlinear coupling between waves is essential.

Estimations show that in the cases when power of the laser or laser module optical radiation is larger than 0.5 $P_M$ is also can be of interest. The power larger than 1.5 $P_M$ also can be of interest. But powers of laser in ten times larger than $P_M$ is hardly to be of interest, because almost all power is in one of the UDCWs only, and power transfer between the UDCWs is almost absent and so they hardly obtain essential gain in modulation.

Detailed explanation and definition of the critical power is done in (A. A. Maier. All-optical switching of unidirectional distributively coupled waves. UFN 1995, v.165, N9, p.1037–1075. [Physics-Uspekhi v.38, N9, p.991–1029, 1995]).

In general case critical intensity (power) may be determined from the condition of r=1, where r is a module of elliptical functions, through which powers of UDCWs are expressed at the output of the device (as shown in aforesaid papers).

As a rule the most differential gain is achieved when input power is closed to critical power. In particular this situation takes place when only one from UDCWs is at the input of the nonlinear-optic waveguide, or the input power of one of the UDCWs is much greater than input power of another, thereto linear coupling between the UDCWs is essential.

In some important cases effective switching and obtaining large gain are possible under input radiation powers essentially larger or essentially smaller than critical power.

E.g., when there are two UDCWs with close input powers ($P_{00} \approx P_{10}$) and close phases at the input of the nonlinear optical waveguide or at the input of TCOWs, then the sharp switching between the UDCW powers (at the output) takes place not only if input power close to critical power, but also if input power $P_{00} > 0.25 P_M$; thereto the differential gain increases under increasing of $P_{00}$ even if $P_{00} > P_M$. Note that in this under $P_{00} > 0.25 P_M$ the condition r=1 is also fulfilled, where r is a module of elliptical functions, through which powers of the UDCWs are expressed at the output of the device (as shown in aforesaid papers).

In other special case when at the input $P_{00} \approx 3 P_M$, $P_{10} \approx P_M$, and the difference in input phases of the UDCWs equal to $\pm \pi/2$ the effective switching also can take place and differential gain is much larger than unity.

Thus in some cases, the values of input optical radiation power essentially larger and essentially smaller than critical power can be also of practical interest for suggested switch and amplifier.

For UDCWs in cubic-nonlinear optical waveguide or TCOWs $I_{thr}$ and $I_M$ are usually proportional to $K/|\theta|$, where $\theta$ is a cubic-nonlinear coefficient of the nonlinear optical waveguide. E.g., in the case of UDCWs having different polarizations in the birefringent nonlinear optical waveguide $I_{thr}$ and $I_M$ are proportional to $|\beta_e-\beta_o|/|\theta|$, thereto the critical intensity is larger than threshold intensity (as shown in FIG. 5).

If the suggested devices comprises a laser or laser module as a source of optical radiation then the output power of the laser or laser module should be near to so called the critical power (see e.g., A. A. Maier. All-optical switching of unidirectional distributedly coupled waves. UFN 1995, v.165, N9, p.1037–1075. [Physics-Uspekhi v.38, N9, p.991–1029, 1995]). In particular the continuos waves laser or laser module provides output optical radiation of constant power, thereto the power spread in time does not exceed 1%, thereto the power lies in the range from 0.5 $P_M$ up to 1.5 $P_M$, or even better in the range from 0.9 $P_M$ up to 1.1 $P_M$.

In other preferable embodiment, mode-locked laser has peak output power in the range from 0.5 $P_M$ up to 1.5 $P_M$, or even better in the range from 0.9 $P_M$ up to 1.1 $P_M$.

Let us mention interesting for practice situation when additional laser or laser module of pump optical radiation is used. As a rule the power of pump optical radiation is chosen in the range from 0.5 $P_M$ up to 1.5 $P_M$, or sometimes it is larger.

Another laser or laser module gives signal optical radiation of rather small power compare to that laser of pump optical radiation gives, with the same or different wavelength. Signal optical radiation is transmitted through the optical element comprised in magneto-optical element. The polarization of this signal optical radiation is modulated in magneto-optical element. The pump optical radiation helps to reach necessary nonlinear mode of operation of the nonlinear-optical element which is usually made as nonlinear-optical waveguide. As a rule a mixer of pump radiation and signal radiation are used and comprise in the device.

In particular case, the input optical waveguide contains Y-mixer, into one entrance input branch of which the signal optical radiation is fed, and into other entrance (input) branch—the pump optical radiation is fed; under this the input branch, into which the signal optical radiation is fed, is made from a magneto-optic material and is placed in the solenoid, through which the variable electrical current modulating polarization of signal optical radiation is passed.

If the modulation of optical radiation is carried out, then the threshold power can be also defined as input radiation power or pump radiation power, under exceeding of which the percentage modulation at the output of the device is in 1.05 times greater than that without the nonlinear-optical waveguide and/or than the percentage modulation at the input of the nonlinear-optical waveguide.

The opportunity of the realization of the given invention proves to be true by the following examples.

EXAMPLE 1

Optical radiation with wavelength λ=0.86 μm from the semiconductor laser module linearly polarized along the vertical axis, was passed through a Glan prism (to improve the degree of the radiation polarization), then—through the magneto-optical element, made from magneto-optic glass, doped with terbium (that is diamagnetic Faraday glass), placed in the solenoid, and then the optical radiation is fed into the nonlinear-optical waveguide, radiation-carrying layer of which was made of layered structure such as GaAs/$Al_xGa_{1-x}$As, with x=0.2, representing a multiplicity of quantum wells (MQW) and having birefringence. The optical axis of this birefringent structure was oriented along a vertical axis. The period of the structure was 200 A. The thickness of the radiation-carrying layer was 0.5 μm, and within it approximately 25 periods of the MQW structure were, stacked. The wavelength corresponding to the exiton resonance in the aforesaid structure, was approximately equaled to 0.859 μm. From above and from below of the MQW structure the symmetrically horizontal layers GaAs/$Al_yGa_{1-y}$As with y=0.22 by thickness 1 μm and further (for best waveguide restriction)—layers $Al_yGa_{1-y}$As by thickness 0.5 μm with y=0.35 settled down. The width of the strip ridge-type waveguide was 4 μm. The difference of refractive indices of two irthogonal-polarized waves was $\Delta n \approx 4 \cdot 10^{-3}$.

The area of cross-section was approximately $10^{-7}$ $cm^2$. The nonlinear-optical waveguide was singlemoded. Across the nonlinear-optical waveguide a weak electrical current about 1–2 mA was carried (passed). For this purpose on the waveguide a film electrode from above was put (coated), to which by thermo-compression the thin metal wires were soldered. The top layer of the semiconductor structure, adjoining directly to the film electrode and ensuring electrical contact, represented strongly doped GaAs such as p+with concentration of carriers $10^{19}$ $cm^{-3}$ and had thickness 0.35 μm. From below the waveguide was soldered to a metal plate which was mounted on the Peltier element. So it was in thermal contact with one side of the Peltier element and with one or two sensor (s) of temperature. A sensor was made as thermoresistor. By means of temperature controller electrically connected with the Peltier element the temperature of the nonlinear-optical waveguide was controlled and stabilized; the temperature of the nonlinear-optical waveguide was set to achieve the maximal depth of the modulation at the output of the modulator. In the vicinity of the exiton resonance on the used wavelength nonlinear factor of the nonlinear-optical waveguide was about $\theta \cong 10^{-4}$ esu. This value exceeds the threshold value of nonlinear optical coefficient. The length of the nonlinear-optical waveguide was 1.6 mm. Input and output of radiation was carried out by means of cylindrical lenses and clarified gradans, mounted at an input and output of the nonlinear-optical waveguide. All device containing input gradan, input cylindrical lens, the nonlinear-optical waveguide, output cylindrical lens and output gradan, looked like the united nonlinear-optical module.

The semiconductor laser module was single-moded. The laser module was supplied with a precision current source for passing electrical current through the laser diode. Thereto it was supplied with a thermoelectric Peltier element and two temperature sensors, which were connected to a temperature controller. The temperature controller also operated as a temperature stabilizer.

If electrical current through the solenoid is equal to zero, then the linear polarization is directed along the vertical (y) axis both at the output and at the input of the solenoid.

Through the solenoid the variable electrical current was passed. The change of the current corresponds to the useful (modulating) variable signal (analog or digital). The value and sign of an angle of a deviation (turn) of the polarization plane of the optical radiation, from the vertical axis at the output of the magneto-optical element corresponds to the value and sign of the electrical current passed through the solenoid, and, hence, corresponds to the value and sign of the useful signal. The horizontal component of the electrical field vector at small angles of a deviation from the vertical axis is proportional to the angle of the deviation; and at the same time the vertical component of the electrical field vector almost does not vary. So it is possible to consider, that into the input of the nonlinear optical waveguide (made on the basis of MQW structure), having birefringence (under this the axes of a refractive index ellipse in cross-section of the nonlinear-optical waveguide are directed along axes x and y, the weak variable optical signal with a vector of polarization, directed along a horizontal axis x, and carrying the useful information, arrived. According to the theory in this case the phenomenon of optical self-switching of UDCWs of orthogonal polarizations with nonlinear coupling took place.

Figure 8:
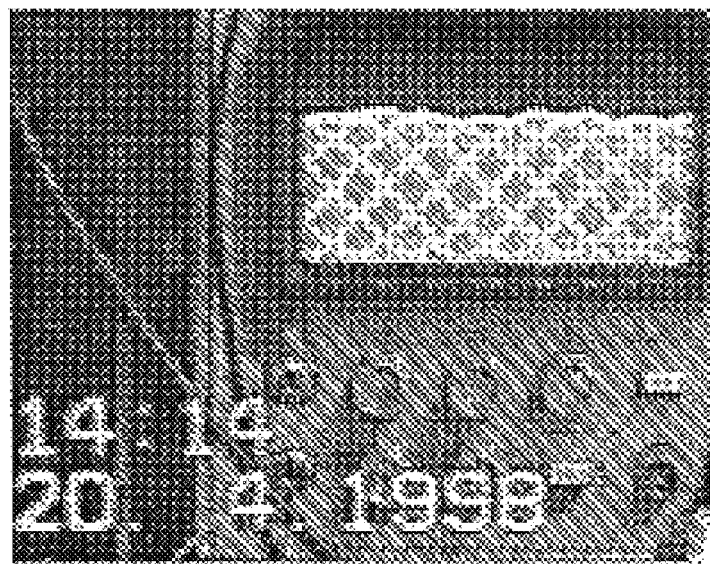
Figure 8:

At the output of polarizer, positioned after the output of the nonlinear-optical waveguide, a useful signal amplified in $10-10^2$ times was received, and the powers of the orthogonal polarized waves at the output of the device changed in opposite phase and the change of each of them in $10$–$10^2$ times exceeded the change of signal amplitude at the input of the nonlinear-optical waveguide (as shown in FIG. 8).

If threshold is exceeded by input optical power, then switching on sinusoidal electrical current through the solenoid, creating magnetic field in the optical element, caused the effect of modulation at the output of the device (FIG. 8a). If input power is less than threshold optical power, then switching on the same electrical current through the solenoid does not cause any observable modulation (FIG. 8b).

If input power is considered as predetermined then we can say that for FIG. 8a the threshold is exceeded by nonlinear coefficient of the nonlinear-optical waveguide, and for FIG. 8b it is not exceeded.

The current of used laser module monitoring photo-diode (proportional to the input optical radiation power) for photo 8a is about 120–130 mA, whereas for photo 8a it is about 45–50 mA.

In essence all-optical transistor operating as amplifier of Faraday effect is created for the first time, and result of its operation is shown in FIG. 8. This all-optical transistor is made in the form of compact nonlinear-optical module.

Under these conditions at the output of the device a depth of modulation was in 102 times more, than in the case of absence of the nonlinear-optical waveguide in the modulator, and the powers of the orthogonal polarized waves at the output of device changed in opposite phase. Therefore for reduction of noise it is possible, having inverted the form of change of power of one of waves, to feed from an output of the device output signals (optical or electrical), each of which corresponds to its own wave, to the correlator and/or differential amplifier (e.g., electrical), in which the difference in powers of the separated UDCWs is separated (singled) out and, thus, noise are cut. Thus it is possible to separate out the amplified information signal cleared from noise, jamming and casual distortions.

The nonlinear optical waveguide is made as birefringent. It should be mentioned that said MQW-type structure almost always has birefringence, however to reach predetermined, sufficiently large birefringence, the difference in refractive indexes of the layers should be sufficiently large; hence value of <<x>> in such structure as $GaAs/Al_xGa_{1-x}$ As should be sufficiently large, e.g. x>0.1.

EXAMPLE 2

Optical radiation as a sequence of supershort pulses by duration 10 ps, with wavelength $\lambda$=1.55 $\mu$m from mode-locked NaCl:OH laser polarized along a vertical axis, passed through a Glan prism, then passed through the magneto-optical element, representing ferromagnetic a crystal garnet (YIG, yttrium-ferrous garnet) placed in the solenoid, and then entered the nonlinear-optical waveguide, radiation-carrying layer of which was made on the basis of the layered MQW-type structure such as $GaAs/Al_yGa_{1-y}As$, with x=0.2, representing a set of quantum wells. The period of one well was 200 Å. The thickness of the radiation-carrying layer was 1 $\mu$m, and on it approximately 40 periods of the structure were stacked. The wavelength, corresponding to an exiton resonance in the said MQW structure, was approximately equaled 0.78 $\mu$m. Strip waveguide width was 4 $\mu$m. The area of cross section approximately was of order of $10^{-7}$ cm$^{-2}$. The difference of refractive indexes of two orthogonal-polarized waves was $\Delta n \approx 4 \cdot 10^{-3}$. Across the nonlinear-optical waveguide a weak electrical current about 1–2 mA was carried (passed). For this purpose on waveguide a film electrode from above was coated, to which with the aid of thermocompression the thin metal wires were soldered. From below waveguide was soldered to a metal plate which mouned on an Peltier element . In area of a two-photon exiton resonance on used wavelength nonlinear factor waveguide was of order of $\theta \approx 10^{-11}$ esu. The waveguide length was 1 mm. The input of radiation into the nonlinear optic waveguide and output of radiation from said waveguide was carried out by means of cylindrical lenses and gradan, mounted at the input and output of the said nonlinear-optical waveguide. All design containing entrance gradan, entrance cylindrical lens, the nonlinear-optical waveguide, output cylindrical lens and output gradan looked like the uniform nonlinear-optical module. Through the solenoid passed a variable electrical current, which change corresponded to a useful variable signal (analog or digital). At the output polarizer, located after the output of the nonlinear-optical waveguide, a useful signal amplified in 10 time was received, and the powers of the orthogonal polarized waves at the output of the device were changed in opposite phase and the change of each of them in 10 times exceeded change of signal amplitude at the input of the nonlinear optical waveguide.

EXAMPLE 3

Optical radiation with wavelength $\lambda$=1.3 $\mu$mm from the semiconductor laser polarized along a vertical axis, passed through a Glan prism, then—through a magneto-optical element, representing a Ferro-magnetic crystal of garnet (YIG, yttrium-ferrous garnet), placed in the solenoid, and then entered in the nonlinear-optical waveguide, radiation-carrying lived which was made of layered structure such as $In_{1-x}Ga_xAs_yP_{1-y}/InP$, with x=0.2, y=2.2x, representing a set of quantum wells. The period of structure was 200 Å. The thickness radiation-carrying core was 0.5 $\mu$m, and on it 20 periods of structure were stacked approximately. Wavelength appropriate to the exiton resonance in the specified structure, was approximately equaled 1.3 $\mu$m. Width strip waveguide made 4 $\mu$m. Length of the waveguide was approximately 1 mm. The difference of refractive indexes of two orthogonal-polarized waves made $\Delta n \approx 4 \cdot 10^{-3}$. The area of cross section approximately $10^{-7}$cm$^2$. Across the waveguide a weak electrical current about 1–10 mA was passed. For this purpose on waveguide a film electrode from above was put, to which with thermo-compression the thin metal wires were soldered. From below the waveguide was soldered to a metal plate which is mounted on the Peltier element. In area of a exiton resonance on used wavelength nonlinear factor of the nonlinear-optical waveguide was about $\theta \approx 10^{-4}$ esu. The input and output of radiation from waveguide was carried out by means of cylindrical lenses and gradan, mounted at the input and output of the nonlinear-optical waveguide. All design containing entrance gradan, entrance cylindrical lens, the nonlinear-optical waveguide, output cylindrical lens and output gradan looked like the uniform module. Through the solenoid the variable electrical current was passed, which change corresponded to a useful variable signal (analog or digital). At an output of polarizer, positioned for an output of the nonlinear-optical waveguide, have received a useful optical signal amplified in 1000 times, and the powers of the orthogonal polarized waves at an output of system changed in opposite phase and the change of each of them in 1000 times exceeded change of signal strength at an input nonlinear waveguide.

As the powers of the orthogonal polarized waves at an output of system changed in opposite phase, for reduction of noise it is possible, having inverted the form of change of power of one of waves, to feed from an output of the device signals (optical or electrical), each of which corresponds UDCWs, on the correlator, in which the common part of change of signals is separated out, and, thus, noise are cut. Thus it is possible to allocate cleared from noise, jamming and casual distortions the amplified information signal. For reduction of noise the signals from an output of the device can move on the correlator, in which the general(common) part of amplification of signals is allocated, and, thus, noise are cut.

EXAMPLE 4

The lasers and the nonlinear-optical waveguide from examples 1–3 were used, but at a zero current through the solenoid the polarization of a field at an output and input of the solenoid, and also at an input of the nonlinear-optical waveguide was directed at an angler 45° to the <<fast>> and/or to the <<slow>> axis of the nonlinear birefringent optical waveguide, which can be chosen as x and y axes.

The alternating current causes a deviation of a vector of a field from initial angular position (not changing its size). This increases a x-component and reduces a y-component (or on the contrary), creating a small variable difference in intensities between waves polarized along axes y and x at an input of a nonlinear-optical element. Under this at an output of a nonlinear-optical element this difference grows in many times. The gain was due the self-switching of UDCWs with orthogonal polarizations, which arosed in the nonlinear-optical waveguide.

EXAMPLE 5

The continuos sequence of optical soliton-like pulses with duration of 100 fs-10 ps with wavelength $\lambda \approx 1.55$ $\mu$m and peak power more 100 W, passed through a Glan prism (i.e. polarizer), then—through the magneto-optical element, representing ferro-magnetic crystal of garnet (YIG, yttrium-ferruterous garnet), placed in the solenoid, and then entered nonlinear-optical fiber-optic waveguide, with birefringence about $10^{-7}$; and cubic-nonlinear coefficient (factor) $\theta \approx 10^{-13}$ esu. At the input optical radiation was polarized lengthways (or perpendicularly) to vertical axis (y), which is parallel to the axis of the ellipse of effective refractive index in cross-section of the fiber-optic waveguide, i.e. the vector of field $\vec{E}$ of the radiation field of the soliton-like pulse was directed along the vertical axis (y) and along the same axis (or perpendicularly to it) the axis of the effective refractive index ellipse in cross-section of fiber-optic waveguide was directed. The area of cross section approximately $10^{-7}$ cm$^2$. The length of the fiber-optic waveguide was 10 m. The intensity of optical radiation was installed greater, than $3 \times (c/2\pi) \times (\Delta n/|\theta|) \approx 10^9$ W/cm$^2$, i.e. entered optical radiation power was about 100 W. The difference of refractive indexes An of two orthogonally polarized waves in the nonlinear-optical waveguide was $10^{-7}$. The input of the radiation into the nonlinear-optical waveguide and output of the optical radiation from the nonlinear-optical waveguide were carried out with the help gradan, mounted on an input and output of the nonlinear-optical waveguide. All design containing input gradan, input cylindrical lens, the nonlinear-optical waveguide, output cylindrical lens and output gradan looked like the united nonlinear-optical module. At a zero current through the solenoid the polarization of a field at the output and input of the solenoid, and also at the input of the fiber-optic waveguide was directed along the vertical axis (y) parallel the optical axis of the ellipse of effective refractive index in cross-section of the fiber-optic waveguide. Through the solenoid the variable electrical current was passed, which change corresponded to a useful variable signal (analog or digital). At these conditions at the output of the device the depth of modulation was achieved in $10^3$ times above, than in case of absence of a nonlinear-optical element in the modulator, and the powers of the orthogonally polarized UDCWs at the output of the system were changed in opposite phase.

EXAMPLE 5

Same, that in examples 3, 4, but as the optical element in the magneto-optic element there was used magneto-optic glass (diamagnetic Faraday glass), for example, glass doped with terbium, placed in the solenoid.

EXAMPLE 6

Same, that in an example 5, but as the optical element there was used a fiber-optic waveguide, made from magneto-optical glass, and placed in the solenoid.

EXAMPLE 7

Same, that in examples 1–5, but at the input of the nonlinear-optical waveguide the optical radiation was polarized at an angle of 45° (to a vertical axis (y), parallel to the axis of the ellipse of the effective refractive index in cross-section of the nonlinear-optical waveguide, i.e. the vector of field E of radiation fed into the nonlinear-optical waveguide, is directed at the angle of 45° to the vertical axis (y), along which the axis of the ellipse of the effective refractive index in the cross-section of the nonlinear-optical waveguide is directed.

INDUSTRIAL APPLICABILITY

The device on basis of Faraday and Kerr effects can be used in those areas of engineering, where the modulation of optical radiation is required; for example, in creating: optical modulators, optical transmitters, laser locks, small signal amplifiers, optical logic devices, re-translators in optical communications lines, optical relays, registrars of super-small signals, optical systems of reading of the information from memory on magneto-optical disks allowing rewriting, and memory on cylindrical magnetic domains having high density, and also for obtaining short pulses with regulated shape. The modulator on the basis of magneto-optical Kerr phenomenon contains an optical element reflecting optical radiation, with sites of various magnetization.

What is claimed is:

1. A device for modulation of optical radiation and transmission of information based on Faraday effect, containing optically connected magneto-optical element, transmitting optical radiation, and a separator of waves having different polarizations, thereto said magneto-optical element comprises an optical element, made from magneto-optical material and means, creating variable magnetic field in said optical element, CHARACTERIZED in that
it additionally contains a nonlinear-optical element, mounted between said magneto-optical element and said separator of waves of different polarizations,
thereto said nonlinear-optical element is made with possibility of propagation in it at least two unidirectional distributively coupled waves of different polarizations,
thereto the nonlinear coefficient of said nonlinear-optical element is larger than the threshold nonlinear coefficient, thereto a length of the nonlinear-optical element is not less than the length, which is necessary for switching or transfer at least 10% of a power from one said unidirectional distributively coupled waves to another unidirectional distributively coupled wave with different polarization, thereto the length of the nonlinear-optical element, which is necessary for switching or transfer at least 10% of a power of one of said unidirectional distributively coupled waves to another unidirectional distributively coupled wave with different polarization, does not exceed the length at which a power of the most attenuated wave, from the unidirectional distributively coupled waves of different polarizations, is attenuated by a factor 20 or less.

2. The device as set above in claim 1, CHARACTERIZED in that the length of the nonlinear-optical element is not less than the length, which is necessary for switching or transfer at least 50% of a power from one said unidirectional distributively coupled waves to another unidirectional distributively coupled wave with different polarization, thereto the length of the nonlinear-optical element, which is necessary for switching or transfer at least 50% of a power of one of said unidirectional distributively coupled waves to another unidirectional distributively coupled wave with different polarization, does not exceed the length at which a power of the most attenuated wave, from the unidirectional distributively coupled waves of different polarizations, is attenuated by a factor 10.

3. The device as set above in claim 1, CHARACTERIZED in that said unidirectional distributively coupled waves of different polarizations are the waves of mutually orthogonal polarizations.

4. The device as set above in claim 1, CHARACTERIZED in that the nonlinear-optical element possesses an optical birefringence and/or is made from magneto-active and/or optically active material.

5. The device as set above in claim 1, CHARACTERIZED in that the nonlinear-optical element is made as a nonlinear-optical waveguide.

6. The device as set above in claim 5, CHARACTERIZED in that the nonlinear-optical waveguide is singlemoded.

7. The device as set above in claim 1, CHARACTERIZED in that said optical element comprising in said magneto-optical element is made as an optical waveguide or in the form of cylinder, or in the form of parallelepiped, or in the form of disk, or in the form of plate.

8. The device as set above in claim 1 CHARACTERIZED in that it additionally contains a phase compensator, made as a birefringent element, placed between the magneto-optical element and the nonlinear-optical elements.

9. The device as set above in claim 8, CHARACTERIZED in that said birefringent element is made as a birefringent optical waveguide, or a fiber-optic phase compensator, or a fiber polarization controller, or an optical waveguide made from electrooptical material, supplied with electrical contacts, or an electrooptical crystal, supplied with electrical contacts, or a phase plate, or an acousto-optical crystal, or an optical waveguide made from an acousto-optical material.

10. The device as set above in claim 1, CHARACTERIZED in that it additionally contains at least one optical isolator and/or a polarizer, thereto the optical isolator and/or the polarizer is mounted before said magneto-optical element, and/or after the output of the nonlinear-optical element the optical isolator is mounted.

11. The device as set above in claim 10, CHARACTERIZED in that the polarizer, mounted in front of the magneto-optical element and/or separator of waves having different polarizations, mounted after said nonlinear-optical element, is made as a polaroid, or a polarizing prism, or a birefringent prism, or a directional coupler, separating waves with different polarizations, or a polarizer based on an optical waveguide.

12. The device as set above in claim 10, CHARACTERIZED in that said optical isolator operates as said separator of waves having different polarizations.

13. The device as set above in claim 10, CHARACTERIZED in that the optical isolator and/or said polarizer is made as an optical waveguide or a fiber-optic waveguide.

14. The device as set above in claim 5, CHARACTERIZED in that said optical waveguide comprising in said magneto-optical element and said nonlinear-optical waveguide is made as a united optical waveguide.

15. The device as set above in claim 14, CHARACTERIZED in that said optical waveguide comprising in said magneto-optical element, said nonlinear-optical waveguide, and said separator of waves with different polarizations, representing an waveguide polarizer, are made in the form of the united optic waveguide.

16. The device as set above in claim 15, CHARACTERIZED in that said optical waveguide comprising in said magneto-optical element, said nonlinear-optical waveguide, said separator of waves with different polarizations are made in the form of the united optical waveguide.

17. The device as set above in claim 16, CHARACTERIZED in that it additionally contains a birefringent optical waveguide mounted between said magneto-optical element and said nonlinear-optical waveguide, thereto said optical waveguide comprising in said magneto-optical element, said birefringent optical waveguide, said nonlinear-optical waveguide, said separator of waves with different polarizations are made as the united optical waveguide.

18. The device as set above in claim 4, CHARACTERIZED in that said nonlinear-optical element is mounted relative to the electrical field vector of the optical radiation fed into the nonlinear-optical element so that the average over time electrical field vector or axis of ellipse of polarization of optical radiation fed into the nonlinear-optical element is directed at the angle υ, $-15°<υ<15°$ to the <<fast>> and/or <<slow>> axis of the nonlinear-optical element.

19. The device as set above in claim 18, CHARACTERIZED in that said nonlinear-optical element is mounted relative to the electrical field vector of the optical radiation fed into the nonlinear-optical element so that an average over time electrical field vector or axis of ellipse of polarization of optical radiation fed into the nonlinear-optical element is coincided with the <<fast>>and/or <<slow>> axis of said nonlinear-optical element.

20. The device as set above in claim 4, CHARACTERIZED in that said nonlinear-optical element is mounted relative to the average over time electrical field vector of the optical radiation fed into said nonlinear-optical element so that the <<fast>> and/or <<slow>> axis of said nonlinear-optical element is directed at an angle of θ, $30°<θ<60°$ to said electrical field vector or said axis of ellipse of polarization of optical radiation fed into said nonlinear-optical element.

21. The device as set above in claim 20, CHARACTERIZED in that said nonlinear-optical element is mounted relative to the average over time electrical field vector of the optical radiation fed into said nonlinear-optical element so that the <<fast>> and/or <<slow>> axis of said nonlinear-optical element is coincided with the average over time electrical field vector or said axis of ellipse of polarization of optical radiation fed into said nonlinear-optical element.

22. The device as set above in any of claims 5, CHARACTERIZED in that the nonlinear-optical waveguide is made as a nonlinear fiber-optic waveguide.

23. The device as set above in any of claims 22, CHARACTERIZED in that the nonlinear-optical waveguide is made as a birefringent nonlinear fiber-optic waveguide.

24. The device as set above in claim 23, CHARACTERIZED in that the nonlinear-optical waveguide is made as a birefringent nonlinear fiber optic waveguide, made from a semiconductor doped glass.

25. The device as set above in claim 5, CHARACTERIZED in that at the input and/or output end of said fiber optic waveguide a lens is made and/or a gradan is mounted.

26. The device as set above in claim 22, CHARACTERIZED in that aforesaid optical element comprising in said magneto optical element is optically connected with non-linear fiber-optic waveguide by a fiber-optic connector and/or by optical connecting socket, or by splice, or by soldering, or by glue, or by welding, or by a miniature mechanical connector.

27. The device as set above in any of claims 5, CHARACTERIZED in that said nonlinear-optical waveguide is made on the basis of semiconductor layered, MQW-type structure with alternating layers, containing at least two hetero-transition, thereto wavelength $\lambda_r$ of one-photon and/or two-photon exiton resonance and/or band-gap resonance and/or half-band-gap resonance in said semiconductor layered structure of said nonlinear-optical waveguide is satisfied the inequalities $0.5\lambda_r \leq \lambda \leq 1.5\lambda_r$, where $\lambda$ is wavelength of at least one radiation fed into the nonlinear-optical waveguide.

28. The device as set above in claim 27, CHARACTERIZED in that said nonlinear-optical waveguide is supplied with electrical contacts for carrying of an electrical current through it.

29. The device as set above in claim 28, CHARACTERIZED in that it contains an electrical current source, electrically connected with the electrical contacts of said nonlinear-optical waveguide.

30. The device as set above in claim 29, CHARACTERIZED in that the electrical current source is a constant current source providing the electrical current across said nonlinear-optical waveguide in operation with values from 0.5 mA to 10 mA, thereto the current spread from an average value over time does not exceed 0.1 mA.

31. The device as set above in claim 27, CHARACTERIZED in that said semiconductor layered MQW-type structure is made in the form of alternating layers $GaAs/Al_xGa_{1-x}As$, or $In_xGa_{1-x}As/InP$, or $In_{1-x}Ga_xAs_yP_{1-y}/In_{1-x'}Ga_{x'}As_{y'}P_{1-y'}$, where $x \neq x'$ and/or $y \neq y'$, or $CdSe_{1-x}S_x/CdSe$ or $InAs_{1-x}Sb_x/InAs$, or $PbS_xSe_{1-x}/PbSe$, or $Ge_xSi_{1-x}/Si$.

32. The device as set above in claim 5, CHARACTERIZED in that the input and/or output ends of said nonlinear-optical waveguide have antireflection coating(s).

33. The device as set above in claim 27, CHARACTERIZED in that it contains input/output elements, mounted at the input/output of said nonlinear-optical waveguide correspondingly, thereto the input/output elements are mounted relative to the nonlinear-optical waveguide with a precision, provided by their positioning by luminescent radiation of said nonlinear-optical waveguide, arisen when electrical current is carried across said nonlinear-optical waveguide.

34. The device as set above in claim 33, CHARACTERIZED in that said current is more than 20 mA.

35. The device as set above in claim 33, CHARACTERIZED in that input/output elements of radiation are made in the form of objectives comprising a cylindrical lens and/or a gradan.

36. The device as set above in claim 35, CHARACTERIZED in that when positioning and/or mounting said input and/or output elements made as objectives relative to said nonlinear-optical waveguide is accomplished up until formation of collimated optical radiation beam outside the said objectives.

37. The device as set above in claim 36, CHARACTERIZED in that the said collimated optical radiation beam is an axial symmetric beam.

38. The device as set above in claim 33, CHARACTERIZED in that input/output elements are made in the form of input and/or output optical waveguide.

39. The device as set above in claim 38, CHARACTERIZED in that when positioning and/or mounting said input and/or output optical waveguides, relative to said nonlinear-optical waveguide is done up until obtaining the maximum of input radiation power into the said optical waveguides.

40. The device as set above in claim 38, CHARACTERIZED in that at the input and/or output end of input and/or output optical waveguide a lens is formed and/or a gradan is installed.

41. The device as set above in claim 38, CHARACTERIZED in that the input optical waveguide contains an optical waveguide mixer, made as at least one Y-connector or directional coupler.

42. The device as set above in claim 41, CHARACTERIZED in that at least part of at least one input branch of said waveguide mixer is aforesaid optical element comprising in magneto-optical element, made from magneto-optical material and placed in a solenoid.

43. The device as set above in claim 27, CHARACTERIZED in that it additionally contains at least one thermoelectric Peltier element and at least one sensor of temperature, thereto one side of said Peltier element is in thermal contact with the nonlinear-optical waveguide and with at least one sensor of temperature.

44. The device as set above in claim 43, CHARACTERIZED in that at least one said Peltier element and at least one said sensor of temperature are electrically connected with a controller and/or a stabilizer of the temperature.

45. The device as set above in claim 1 CHARACTERIZED in that the means, creating the magnetic field, is made as a solenoid.

46. The device as set above in claim 1 CHARACTERIZED in that after said separator of said unidirectional distributively coupled waves a correlator and/or differential amplifier for treating said separated opposite-modulated waves is set.

47. The device as set above in claim 1 CHARACTERIZED in that it is provided with at least one additional focusing objective and mounted before said magneto optical element and/or before said nonlinear-optical element, and/or with at least one collimating objective placed after said magneto optical element and/or after said nonlinear-optical element.

48. The device as set above in claim 47 CHARACTERIZED in that the additional focusing objective and/or collimating objective comprise a gradan and/or a lens.

49. The device as set above in claim 1 CHARACTERIZED in that said optical element, comprising in said magneto-optical element, is made as the optical element transmitting optical radiation, and having sites of different magnetization, thereto a means, creating variable magnetic field in said optical element, is made as a device of moving of said optical element in space, or made as a device of scanning the modulated radiation beam over said optical element.

50. The device as set above in claim 49 CHARACTERIZED in that it is provided with at least one additional focusing objective, e.g. made as a gradan and/or a lens, and mounted before said magneto optical element and/or before said nonlinear-optical element, and/or with at least one collimating objective, e.g. made as a gradan and/or as a lens, placed after said magneto optical element and/or before said nonlinear-optical element.

51. The device as set above in claim 1 CHARACTERIZED in that it additionally contains a laser or laser module, which is used as a source of aforesaid optical radiation, intended to be modulated, mounted before said magneto-optical element, thereto said laser or laser module, said optical element comprising in said magneto-optical element, said nonlinear-optical element, and said separator of waves with different polarizations are optically connected.

52. The device as set above in claim 51, CHARACTERIZED in that the laser or laser module is single-moded for optical radiation, intended to be modulated.

53. The device as set above in claim 51, CHARACTERIZED in that the laser or laser module is a single-frequency laser or laser module.

54. The device as set above in claim 51, CHARACTERIZED in that the laser or laser module is mode-locked.

55. The device as set above in claim 51, CHARACTERIZED in that the laser or laser module is a semiconductor laser or laser module.

56. The device as set above in claim 55, CHARACTERIZED in that said semiconductor laser or laser module is provided with at least one thermoelectric Peltier element and with at least one sensor of temperature, thereto one side of which is in thermal contact with a laser diode and with at least one sensor of temperature, thereto said thermoelectric Peltier element and said sensor are electrically connected to a temperature controller and/or stabilizer.

57. The device as set above in claim 55, CHARACTERIZED in that the laser module is made as a fiber-optic module.

58. The device as set above in claim 57, CHARACTERIZED in that the laser module mounted before said magneto-optical element is optically connected with an optical waveguide comprising in said magneto-optical element, thereto the laser module, said optical waveguide comprising in said magneto-optical element, said nonlinear-optical waveguide and said separator of waves of different polarizations are made as the united optical waveguide.

59. The device as set above in claim 57, CHARACTERIZED in that the semiconductor laser and/or laser module, and/or aforesaid optical waveguide comprising in said magneto optical element, and/or aforesaid nonlinear-optical waveguide, and/or aforesaid fiber-optic phase compensator, and/or aforesaid separator of waves of different polarizations, and/or aforesaid polarizer, set at the input of aforesaid magneto optical element, and/or aforesaid optical isolator set before the magneto optical element and/or at the output of the device for modulation of optical radiation and transmission of information are connected by means of optical fiber connectors and/or connecting optical sockets.

60. The device as set above in claim 59, CHARACTERIZED in that said connection is made with possibility of rotation of said elements relative to each other around longitudinal axis of the device.

61. The device as set above in claim 59, CHARACTERIZED in that the optical fiber connectors are made in the form of FC/PC.

62. The device as set above in claim 55, CHARACTERIZED in that the laser module is made as an air-path module, with a cylindrical lens and a gradan for collimating output optical radiation.

63. The device as set above in claim 51, CHARACTERIZED in that the laser module provides output optical radiation with power lies in the range from 0.25 $P_M$ up to 1.5 $P_M$, where $P_M$ is the critical power.

64. The device as set above in claim 63, CHARACTERIZED in that the laser module provides output optical radiation with power lies in the range from 0.25 $P_M$ up to 1.5 $P_M$, thereto the power spread in time does not exceed 1%.

65. The device as set above in claim 54, CHARACTERIZED in that the laser module provides output optical radiation with peak power lies in the range from 0.25 $P_M$ up to 5 $P_M$, where $P_M$ is the critical power.

66. A device for modulation of optical radiation and transmission of information on the basis of magneto optical Kerr phenomenon, comprising optically connected an optical element having sites of different magnetization and reflecting modulated optical radiation beam, and a separator of waves of different polarizations, thereto the device for modulation of optical radiation and transmission of information is provided with a device for moving said sites of said optical element with different magnetization in space relative to said modulated optical radiation beam, or with a device of scanning said modulated optical radiation beam over the optical element, CHARACTERIZED in that
it additionally contains the nonlinear-optical element, mounted between said optical element and said separator of waves of different polarizations,
thereto said nonlinear-optical element is made with possibility of propagation in it at least two unidirectional distributively coupled waves of different polarizations,
thereto the nonlinear coefficient of said nonlinear-optical element is larger than the threshold nonlinear coefficient,
thereto a length of the nonlinear-optical element is not less than the length, which is necessary for switching or transfer at least 10% of power from one of said unidirectional distributively coupled waves to another unidirectional distributively coupled wave with different polarization, thereto the length of said nonlinear-optical element, which is necessary for switching or transfer at least 10% of power from one of said unidirectional distributively coupled waves to another unidirectional distributively coupled wave with different polarization, does not exceed the length at which power of the most attenuated wave, from said unidirectional distributively coupled waves of different polarizations, is attenuated by a factor 20 or less.

67. The device as set above in claim 66, CHARACTERIZED in that a length of the nonlinear-optical element is not less than the length, which is necessary for switching or transfer at least 50% of power from one of said unidirectional distributively coupled waves to another unidirectional distributively coupled wave with different polarization, thereto the length of said nonlinear-optical element, which is necessary for switching or transfer at least 50% of power from one of said unidirectional distributively coupled waves to another unidirectional distributively coupled wave with different polarization, does not exceed the length at which power of the most attenuated wave, from said unidirectional distributively coupled waves of different polarizations, is attenuated by a factor 10.

68. The device as set above in claim 66, CHARACTERIZED in that said optical element comprising in said magneto-optical element is made in the form of plate, or in the form of disk.

69. The device as set above in claim 66, CHARACTERIZED in that it is provided with at least one additional focusing objective, e.g. made as a gradan and/or a lens, and mounted before said magneto optical element and/or before said nonlinear-optical element, and/or with at least one collimating objective, e.g. made as a gradan and/or a lens, placed after said magneto optical element and/or after said nonlinear-optical element.

70. The device as set above in claim 66, CHARACTERIZED in that said unidirectional distributively coupled waves of different polarizations are the waves of mutually orthogonal polarizations.

71. The device as set above in claim 66, CHARACTERIZED in that the nonlinear-optical element possesses a optical birefringence and/or,is made from magneto-active and/or optically active material.

72. The device as set above in claim 66, CHARACTERIZED in that the nonlinear-optical element is made as a nonlinear-optical waveguide.

73. The device as set above in claim 72, CHARACTERIZED in that the nonlinear-optical waveguide is singlemoded for optical radiation, intended to be modulated.

74. The device as set above in claims 66 CHARACTERIZED in that it additionally contains a phase compensator, made as a birefringent element, placed between the magneto-optical element and the nonlinear-optical element.

75. The device as set above in claim 74, CHARACTERIZED in that said birefringent element is made as a birefringent optical waveguide, or a fiber-optic phase compensator, or a fiber polarization controller, or an optical waveguide made from electrooptical material, supplied with electrical contacts, or a electrooptical crystal. supplied with electrical contacts, or a phase plate, or an acousto-optical crystal, or an optical waveguide made from an acousto-optical material.

76. The device as set above in claim 66, CHARACTERIZED in that before said magneto-optical element an optical isolator and/or a polarizer is mounted and at the output of the device for modulation of optical radiation and transmission of information an optical isolator is placed.

77. The device as set above in claim 76, CHARACTERIZED in that the polarizer, mounted in front of the magneto-optical element and/or separator of waves having different polarizations, mounted after said nonlinear-optical element, is made as a polaroid, or a polarizing prism, or a birefringent prism, or a directional coupler, separating waves with different polarizations, or a polarizer based on an optical waveguide.

78. The device as set above in claim 69, CHARACTERIZED in that said optical isolator operates as said separator of waves having different polarizations.

79. The device as set above in claim 69, CHARACTERIZED in that the optical isolator and/or said polarizer is made as an optical waveguide or a fiber-optic waveguide.

80. The device as set above in claim 71, CHARACTERIZED in that said nonlinear-optical element is mounted relative to the electrical field vector of the optical radiation fed into the nonlinear-optical element so that the electrical field vector or axis of ellipse of polarization of optical radiation fed into the nonlinear-optical element is directed at an angle υ, $-15° < υ < 15°$ to the <<fast>> and/or <<slow>> axis of the nonlinear-optical element.

81. The device as set above in claim 80, CHARACTERIZED in that said nonlinear-optical element is mounted relative to the electrical field vector of the optical radiation fed into the nonlinear-optical element so that the electrical field vector or axis of ellipse of polarization of optical radiation fed into the nonlinear-optical element is coincided with the <<fast>> and/or <<slow>> axis of said nonlinear-optical element.

82. The device as set above in claim 71, CHARACTERIZED in that said nonlinear-optical element is mounted relative to the electrical field vector of the optical radiation fed into said nonlinear-optical element so that the <<fast>> and/or <<slow>> axis of said nonlinear-optical element is directed at an angle of θ, $30° < θ < 60°$ to said electrical field vector or said axis of ellipse of polarization of optical radiation fed into said nonlinear-optical element.

83. The device as set above in claim 82, CHARACTERIZED in that said nonlinear-optical element is mounted relative to the electrical field vector of the optical radiation fed into said nonlinear-optical element so that the <<fast>> and/or <<slow>> axis of said nonlinear-optical element is coincided with said electrical field vector or said axis of ellipse of polarization of optical radiation fed into said nonlinear-optical element.

84. The device as set above in claim 72, CHARACTERIZED in that said nonlinear-optical waveguide is made as a nonlinear fiber-optic waveguide.

85. The device as set above in claim 84, CHARACTERIZED in that the nonlinear-optical waveguide is made as a birefringent nonlinear fiber optic waveguide, made from a semiconductor doped glass.

86. The device as set above in claim 72, CHARACTERIZED in that at the input and/or output end of said fiber optic waveguide a lens is made and/or a gradan is mounted.

87. The device as set above in any of claims 72, CHARACTERIZED in that said nonlinear-optical waveguide is made on the basis of semiconductor layered MQW-type structure with alternating layers, containing at least two hetero-transition, thereto the wavelength $λ_r$ of one-photon and/or two-photon exiton resonance and/or band-gap resonance and/or half-bandgap resonance in said semiconductor layered structure of said nonlinear-optical waveguide is satisfied inequalities $0.5\ λ_r ≦ λ ≦ 1.5 λ_r$, where $λ$ is wavelength of at least one radiation fed into the nonlinear-optical waveguide.

88. The device as set above in claim 87, CHARACTERIZED in that said nonlinear-optical waveguide is supplied with electrical contacts for carrying electrical current through it.

89. The device as set above in claim 88, CHARACTERIZED in that it contains an electrical current source, electrically connected with the electrical contacts of said nonlinear-optical waveguide.

90. The device as set above in claim 89, CHARACTERIZED in that the electrical current source is a constant current source providing the electrical current across said nonlinear-optical waveguide in operation with values from 0.5 mA to 10 mA, thereto the current spread from an average value over time does not exceed 0.1 mA.

91. The device as set above in claim 87, CHARACTERIZED in that said semiconductor layered MQW-type structure is made in the form of alternating layers $GaAs/Al_xGa_{1-x}As$, or $In_xGa_{1-x}As/InP$, or $In_{1-x}GA_xAs_yP_{1-y}/In_{1-x'}Ga_{x'}As_{y'}P_{1-y'}$, where x≠x' and/or y≠y', or $CdSe_{1-xSx}/CdSe$ or $InAs_{1-x}Sb_x/InAs$, or $PbS_xSe_{1-x}/PbSe$, or $Ge_xSi_{1-x}/Si$.

92. The device as set above in claim 72, CHARACTERIZED in that the input and/or output ends of said nonlinear-optical waveguide have antireflection coating(s).

93. The device as set above in claim 92, CHARACTERIZED in that the antireflection coating decreases reflectance coefficient per the input/output end up to value not more than 1%.

94. The device as set above in claim 81, CHARACTERIZED in that it contains input/output elements, mounted at the input/output of said nonlinear-optical waveguide correspondingly, thereto the input/output elements are mounted relative to the nonlinear-optical waveguide with a precision, provided by their positioning by luminescent radiation of said nonlinear-optical waveguide, arisen when electrical current is carried across said nonlinear-optical waveguide.

95. The device as set above in claim 94, CHARACTERIZED in that said current is more than 30 mA.

96. The device as set above in claim 94, CHARACTERIZED in that input/output elements of radiation are made in the form of objectives comprising a cylindrical lens and/or a gradan.

97. The device as set above in claim 96, CHARACTERIZED in that when positioning and mounting of said input and/or output elements made as objectives relative to said nonlinear-optical waveguide is done up until formation of collimated optical radiation beam outside the said objectives.

98. The device as set above in claim 97, CHARACTERIZED in that the said collimated optical radiation beam is axial symmetric beam.

99. The device as set above in claim 94, CHARACTERIZED in that input/output elements are made in the form of input and/or output optical waveguide.

100. The device as set above in claim 99, CHARACTERIZED in that when positioning and/or mounting said input and/or output optical waveguides, relative to said nonlinear-optical waveguide is done up until obtaining the maximum of input radiation power into the said optical waveguides.

101. The device as set above in claim 99, CHARACTERIZED in that at the output and/or input end of input and/or output optical waveguide a lens is formed and/or a gradan is installed.

102. The device as set above in claim 101, CHARACTERIZED in that said lens is made as parabolic and/or conic and/or cylindrical.

103. The device as set above in claim 99, CHARACTERIZED in that said input optical waveguide contains optical waveguide mixer, made as at least one Y-connector or directional coupler.

104. The device as set above in claim 103, CHARACTERIZED in that at least part of at least one input branch of said waveguide mixer is aforesaid optical element comprising in magneto-optical element, made from magneto-optical material and placed in aforesaid solenoid.

105. The device as set above in claim 87, CHARACTERIZED in that it additionally contains at least one thermoelectric Peltier element, one side of which is in thermal contact with the nonlinear-optical waveguide and with at least one sensor of temperature.

106. The device as set above in claim 105, CHARACTERIZED in that at least one said Peltier element and at least one said sensor of temperature are electrically connected with a controller and/or a stabilizer of the temperature.

107. The device as set above in claim 105, CHARACTERIZED in that said sensor of temperature is made as a thermistor and/or a thermoelectric couple and/or a sensor in the form of an integrated scheme.

108. The device as set above in any of claim 66, CHARACTERIZED in that it additionally contains at least one laser or laser module, which is used as a source of aforesaid optical radiation beam, intended to be modulated, mounted before said optical element, thereto said laser or laser module, said optical element, said nonlinear-optical element and said separator of waves having different polarizations are optically connected.

109. The device as set above in claim 108, CHARACTERIZED in that the laser or laser module is single-moded.

110. The device as set above in claim 108, CHARACTERIZED in that the laser or laser module is a single-frequency laser or laser module.

111. The. device as set above in claim 108, CHARACTERIZED in that the laser or laser module is mode-locked.

112. The device as set above in claim 108, CHARACTERIZED in that the laser or laser module is a semiconductor laser and/or laser module.

113. The device as set above in claim 112, CHARACTERIZED in that said semiconductor laser and/or laser module is provided with at least one thermoelectric Peltier element and with at least one sensor of temperature, thereto one side of which is in thermal contact with a laser diode and with at least one sensor of temperature, thereto said thermoelectric Peltier element arid said sensor are electrically connected to a temperature controller and/or stabilizer.

114. The device as set above in claim 112, CHARACTERIZED in that the laser module is made as a fiber-optic module.

115. The device as set above in claim 114, CHARACTERIZED in that at least one gradan is mounted at the output of the fiber-optic module.

116. The device as set above in claim 112 CHARACTERIZED in that the laser module is made as an air-path module, with a cylindrical lens and a gradan for collimating output optical radiation.

117. The device as set above in claim 108, CHARACTERIZED in that the laser or laser module provides output optical radiation with power lying in the range from 0.25 $P_M$ up to 5 $P_M$, where $P_M$ is the critical power.

118. The device as set above in claim 108, CHARACTERIZED in that the laser or module. provides output optical radiation with power lies in the range from 0.5 $P_M$ up to 1.5 $P_M$.

119. The device as set above in claim 108, CHARACTERIZED in that the laser or laser module provides output optical radiation with peak power lies in the range from 0.25 $P_M$ up to 4 $P_M$, where $P_M$ is the critical power.

120. The device as set above in claim 108 CHARACTERIZED in that the laser or module provides output optical radiation power, which spread in time does not exceed 1%.

121. The device as set above in claim 111, CHARACTERIZED in that the laser or module which output optical radiation is in the form of continues sequence of ultra-short pulses, thereto the spread of peak power from average in time value does not exceed 1%.

122. The device as set above in any of claims 66, CHARACTERIZED in that at the output of the separator of waves of different polarizations a correlator of the optical waves and/or a differential amplifier for treating said separated opposite-modulated waves is set.

* * * * *